(12) United States Patent
Konings et al.

(10) Patent No.: US 11,538,227 B2
(45) Date of Patent: *Dec. 27, 2022

(54) FLICKER MITIGATION WHEN TOGGLING EYEPIECE DISPLAY ILLUMINATION IN AUGMENTED REALITY SYSTEMS

(71) Applicant: Magic Leap, Inc., Plantation, FL (US)

(72) Inventors: Arno Leon Konings, Austin, TX (US); Mihailo Slobodan Zivkovic, Plantation, FL (US); Jose Felix Rodriguez, Hialeah, FL (US); Ricardo Martinez Perez, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,174

(22) Filed: Oct. 25, 2021

(65) Prior Publication Data

US 2022/0044489 A1 Feb. 10, 2022

Related U.S. Application Data

(63) Continuation of application No. 16/519,348, filed on Jul. 23, 2019, now Pat. No. 11,158,129.

(Continued)

(51) Int. Cl.
*G06F 3/01* (2006.01)
*G06T 19/00* (2011.01)
(Continued)

(52) U.S. Cl.
CPC ........ *G06T 19/006* (2013.01); *G02B 27/0101* (2013.01); *G02B 27/0172* (2013.01);
(Continued)

(58) Field of Classification Search
CPC ......... G06T 19/006; G06T 7/70; G06T 13/40; G02B 30/00; G02B 27/01; G02B 27/0172;
(Continued)

(56) References Cited

U.S. PATENT DOCUMENTS 6,850,221 B1 2/2005 Tickle
8,681,073 B1 * 3/2014 Robbins .................. H04N 7/18
345/7

(Continued)

FOREIGN PATENT DOCUMENTS

WO WO 2020/023404 1/2020

OTHER PUBLICATIONS

Azuma, "A Survey of Augmented Reality," Presence: Teleoperators and Virtual Environments, Aug. 1997, 6(4):355-385.

(Continued)

*Primary Examiner* — Antonio A Caschera
(74) *Attorney, Agent, or Firm* — Fish & Richardson P.C.

(57) ABSTRACT

An augmented reality display system can include a partially transparent eyepiece, an ambient light sensor, and an image input device. The image input device can include a light source and a spatial light modulator. The system can also include a controller that determines that no virtual content is being displayed to the user and compares the ambient light to display light to determine if a light source shutoff criterion is satisfied. If the light source shutoff criterion is satisfied, the controller can turn off the light source.

28 Claims, 18 Drawing Sheets

Related U.S. Application Data

(60) Provisional application No. 62/702,834, filed on Jul. 24, 2018, provisional application No. 62/714,593, filed on Aug. 3, 2018.

(51) Int. Cl.
    *G06T 13/40*         (2011.01)
    *G06T 7/70*          (2017.01)
    *G02B 27/01*        (2006.01)
    *G02B 30/00*        (2020.01)

(52) U.S. Cl.
    CPC .............. *G02B 30/00* (2020.01); *G06F 3/011* (2013.01); *G06T 7/70* (2017.01); *G06T 13/40* (2013.01); *G02B 2027/014* (2013.01); *G02B 2027/0141* (2013.01); *G02B 2027/0178* (2013.01); *G06F 2203/012* (2013.01)

(58) Field of Classification Search
    CPC ........ G02B 2027/014; G02B 2027/141; G02B 2027/0178; G06F 3/011; G06F 2203/012
    See application file for complete search history.

(56) References Cited

U.S. PATENT DOCUMENTS

| | | | |
|---|---|---|---|
| 9,081,426 B2 | 7/2015 | Armstrong | |
| 9,215,293 B2 | 12/2015 | Miller | |
| 9,348,143 B2 | 5/2016 | Gao et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,851,563 B2 | 12/2017 | Gao et al. | |
| 9,857,591 B2 | 1/2018 | Welch et al. | |
| 9,874,749 B2 | 1/2018 | Bradski | |
| 10,168,560 B2 * | 1/2019 | Barrau | G02B 27/0172 |
| 10,438,404 B2 * | 10/2019 | Trowbridge | G06T 15/80 |
| 11,158,129 B2 | 10/2021 | Konings et al. | |
| 2006/0028436 A1 | 2/2006 | Armstrong | |
| 2007/0081123 A1 | 4/2007 | Lewis | |
| 2010/0177114 A1 * | 7/2010 | Nakashima | G02B 27/017 345/589 |
| 2012/0127062 A1 | 5/2012 | Bar-Zeev et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0302652 A1 | 10/2015 | Miller et al. | |
| 2015/0302660 A1 | 10/2015 | O'Connor et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2016/0027212 A1 | 1/2016 | Da Veiga et al. | |
| 2017/0309215 A1 * | 10/2017 | Perdices-Gonzalez | G09G 3/3225 |
| 2018/0088323 A1 | 3/2018 | Bao et al. | |
| 2018/0180890 A1 | 6/2018 | Baerenrodt et al. | |
| 2018/0189568 A1 | 7/2018 | Powderly et al. | |

OTHER PUBLICATIONS

Azuma, "Predictive tracking for augmented reality." Dissertation for the degree of Doctor of Philosophy, University of North Carolina at Chapel Hill, Department of Computer Science, Feb. 1995, 262 pages.
Bimber et al., "Spatial Augmented Reality Merging Real and Virtual Worlds," A K Peters, Ltd. (ed.), 2005, 393 pages.
hitl.washington.edu [online], "Hardware," available on or before Oct. 13, 2005, via Internet Archive: Wayback Machine URL <https://web.archive.org/web/20051013062315/http:/www.hitl.washington.edu:80/artoolkit/documenta tion/hardware.htm>, retrieved on Mar. 3, 2021, URL <http://www.hitl.washington.edu/artoolkit/documentation/hardware.htm>, 3 pages.
International Preliminary Report on Patentability in International Appln. No. PCT/US2019/42860, dated Feb. 4, 2021, 7 pages.
International Search Report and Written Opinion in International Appln. No. PCT/US2019/42860, dated Oct. 18, 2019, 21 pages.
Jacob, "Eye Tracking in Advanced Interface Design," Virtual environments and advanced interface design, 1995, 258:288, 50 pages.
Larson et al., "A visibility matching tone reproduction operator for high dynamic range scenes," IEEE Transactions on Visualization and Computer Graphics, 1997, 3(4):291-306.
Tanriverdi et al., "Interacting with Eye Movements in Virtual Environments," Proc. of the SIGCHI Conference on Human Factors in Computing Systems, 2000, pp. 265-272.

* cited by examiner

FLICKER MITIGATION WHEN TOGGLING EYEPIECE DISPLAY ILLUMINATION IN AUGMENTED REALITY SYSTEMS

INCORPORATION BY REFERENCE TO ANY PRIORITY APPLICATIONS

This application is a continuation of U.S. patent application Ser. No. 16/519,348, filed Jul. 23, 2019, and entitled "FLICKER MITIGATION WHEN TOGGLING EYEPIECE DISPLAY ILLUMINATION IN AUGMENTED REALITY SYSTEMS," which claims priority to U.S. Provisional Patent Application No. 62/702,834, filed Jul. 24, 2018, and entitled "FLICKER MITIGATION WHEN TOGGLING EYEPIECE DISPLAY ILLUMINATION IN AUGMENTED REALITY SYSTEMS," and to U.S. Provisional Patent Application No. 62/714,593, filed Aug. 3, 2018, and entitled "FLICKER MITIGATION WHEN TOGGLING EYEPIECE DISPLAY ILLUMINATION IN AUGMENTED REALITY SYSTEMS." These and any other applications for which a foreign or domestic priority claim is identified in the Application Data Sheet as filed with the present application are hereby incorporated by reference in their entireties under 37 CFR 1.57.

BACKGROUND

Field

This disclosure relates to augmented reality and mixed reality display systems.

Description of the Related Art

Modern computing and display technologies have facilitated the development of systems for so called "virtual reality" or "augmented reality" experiences where computer-generated images are presented to a user in a manner such that they may be perceived as being real. A virtual reality (VR) scenario typically involves presentation of computer-generated images without transparency to other actual real-world visual input. An augmented reality (AR) scenario typically involves presentation of computer-generated images as an augmentation to visualization of the actual real world around the user. A mixed reality (MR) scenario is a type of AR scenario and typically involves virtual objects that are integrated into, and responsive to, the actual real world. For example, in an MR scenario, AR image content may be perceived as interacting with objects in the actual real world.

In FIG. 1, an AR scene 1 is depicted. The AR scene 1 includes a real-world park-like setting 6 featuring people, trees, buildings in the background, and a platform 20. Besides seeing these real-world items, virtual content is displayed to the user. In FIG. 1, the virtual content includes a robot statue 10 standing on the platform 20, and a cartoon-like avatar character 2, which seems to be a personification of a bumble bee. Although the user sees this virtual content, these items do not physically exist in the real world.

Although AR and/or MR technologies can already provide users with interesting and enjoyable viewing experiences, there is a need for more immersive user experiences.

DETAILED DESCRIPTION

Example HMD Device

Figure 1:
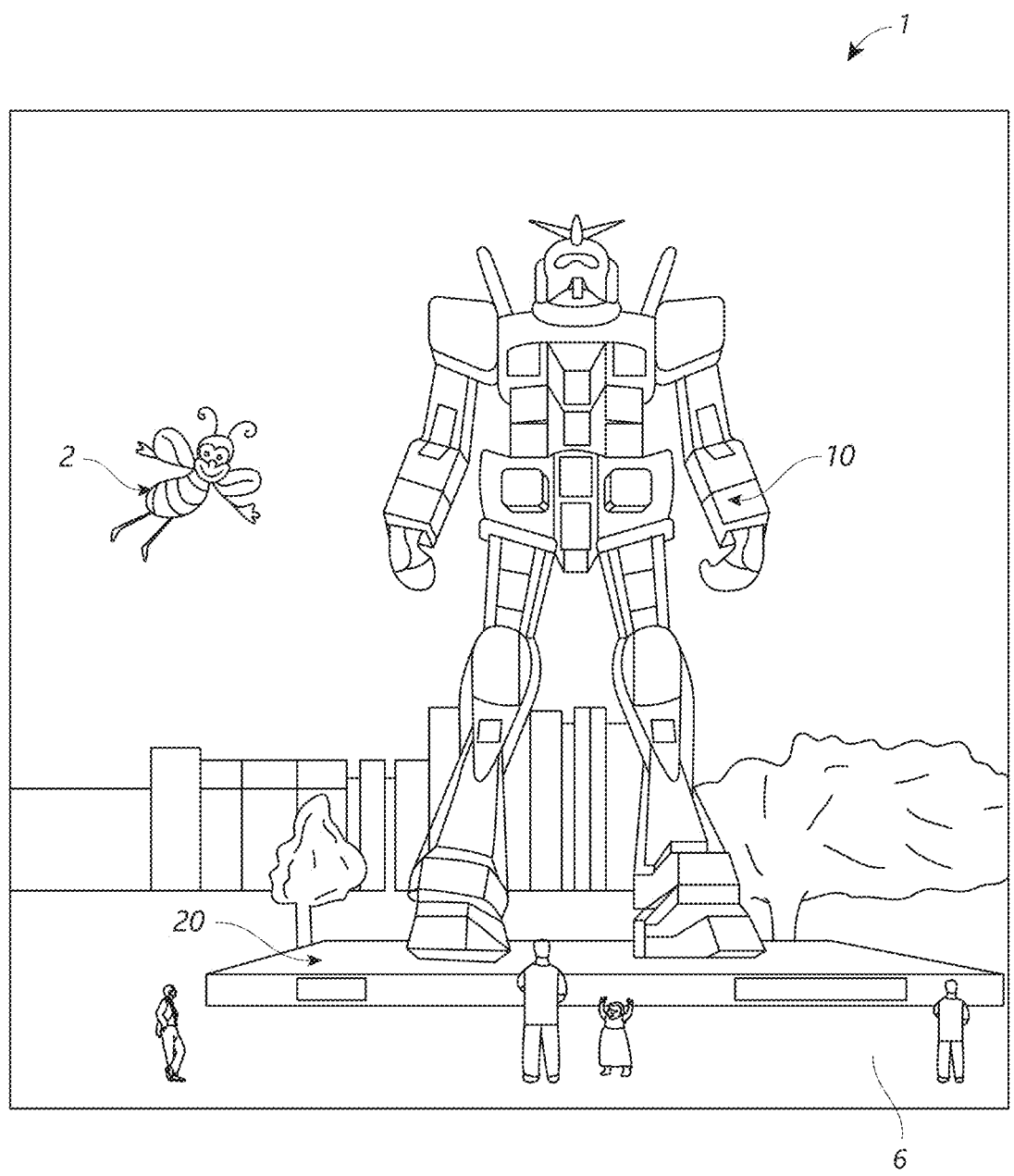
FIG. 1 illustrates a user's view of an augmented reality (AR) scene through an AR device, according to some embodiments.
Figure 2:
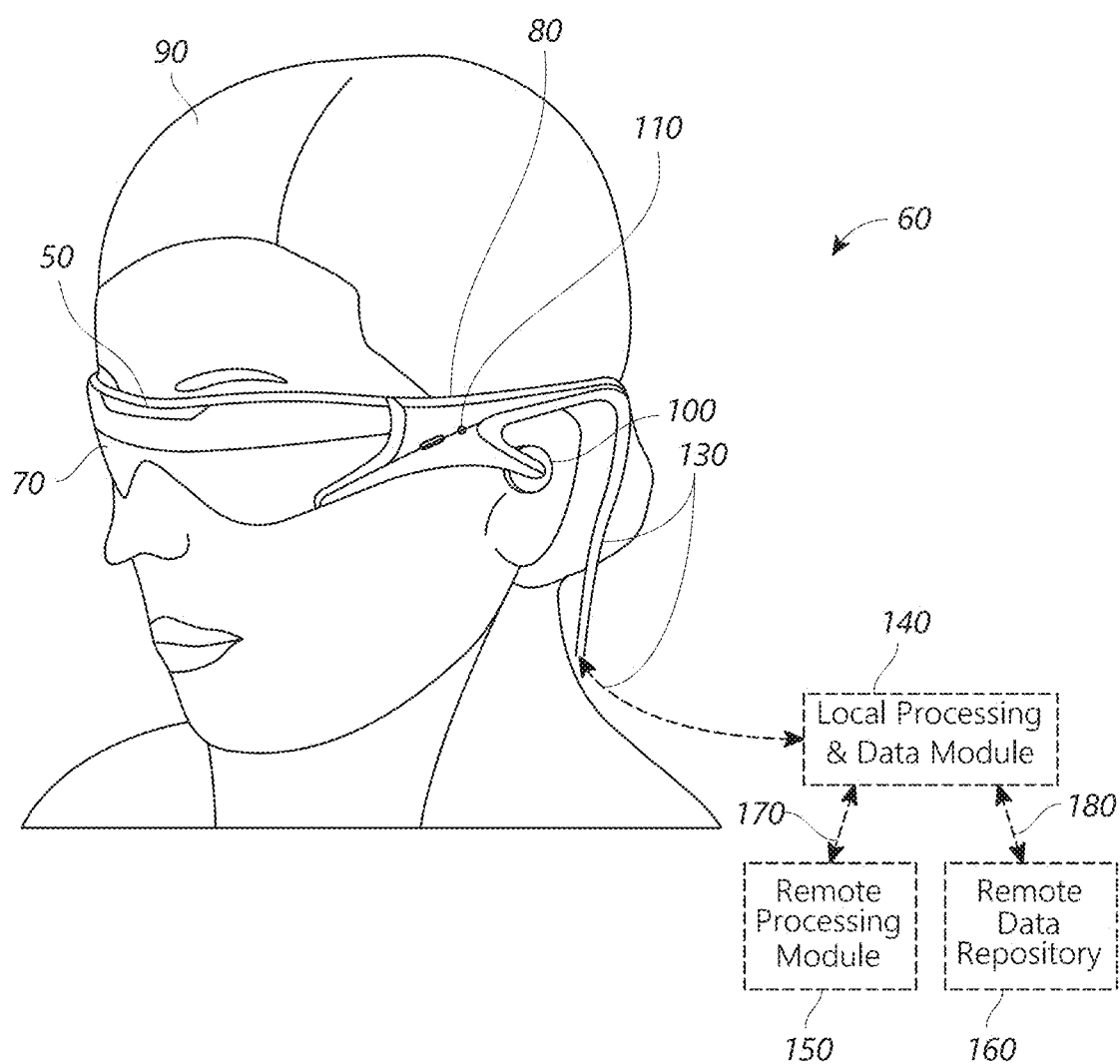
FIG. 2 illustrates an example of a wearable display system, according to some embodiments.

FIG. 2 illustrates an example of a wearable AR display system 60, according to some embodiments. The AR display system 60 includes an eyepiece display 70 and various mechanical and electronic modules and systems to support the functioning of the eyepiece display 70. The eyepiece display 70 may be coupled to a frame 80, which is wearable by a user 90 and which is configured to position the eyepiece display 70 in front of the eyes of the user 90. In some embodiments, a speaker 100 is coupled to the frame 80 such that it is positioned adjacent the ear canal of the user 90. The AR display system 60 may also include one or more microphones 110 to detect sound. In some embodiments, the microphone 110 can allow the user 90 to provide inputs or commands to the AR display system 60 (e.g., the selection of voice menu commands, natural language questions, etc.), and/or may allow audio communication with other persons (e.g., with other users of similar display systems). The microphone 110 can also be used to collect audio data from the user's surroundings. In some embodiments, the AR display system 60 may also include one or more light sensors, such as an ambient light sensor 50 located at an outward-facing position of the frame 80 and/or a display light sensor that is positioned to sense light from the eyepiece display 70, as discussed further below.

The eyepiece display 70 is operatively coupled by a communications link 130, such as by a wired lead or wireless connectivity, to a local processing and data module 140 which may be mounted in a variety of configurations, such as fixedly attached to the frame 80, fixedly attached to a helmet or hat worn by the user 90, embedded in headphones, or removably attached to the user 90 (e.g., in a backpack-style configuration, a belt-coupling style configuration, etc.). The local processing and data module 140 may include a hardware processor, as well as digital memory, such as non-volatile memory (e.g., flash memory or a hard disk drive), both of which may be utilized to assist in the processing, caching, and storage of data. The data may include data that is 1) captured from sensors (which may be, for example, operatively coupled to the frame 80 or otherwise attached to the user 90), such as image capture devices (e.g., cameras), microphones, inertial measurement units, accelerometers, compasses, GPS units, radio devices, gyros, and/or other sensors disclosed herein; and/or 2) acquired and/or processed using a remote processing module 150 and/or a remote data repository 160 (including data relating to virtual content), possibly for passage to the eyepiece display 70 after such processing or retrieval. The local processing and data module 140 may be operatively coupled by communication links 170, 180 (e.g., wired or wireless communication links) to the remote processing module 150 and the remote data repository 160 such that these remote modules 150, 160 are available as resources to the local processing and data module 140.

The remote processing module 150 may include one or more processors to analyze and process data, such as image and audio information. In some embodiments, the remote data repository 160 may be a digital data storage facility, which may be available through the internet or other networking configuration in a "cloud" resource configuration. In some embodiments, the remote data repository 160 may include one or more remote servers, which provide information (e.g., information for generating augmented reality content) to the local processing and data module 140 and/or the remote processing module 150. In other embodiments, all data is stored and all computations are performed in the local processing and data module 140, allowing fully autonomous use from a remote module.

Figure 3:
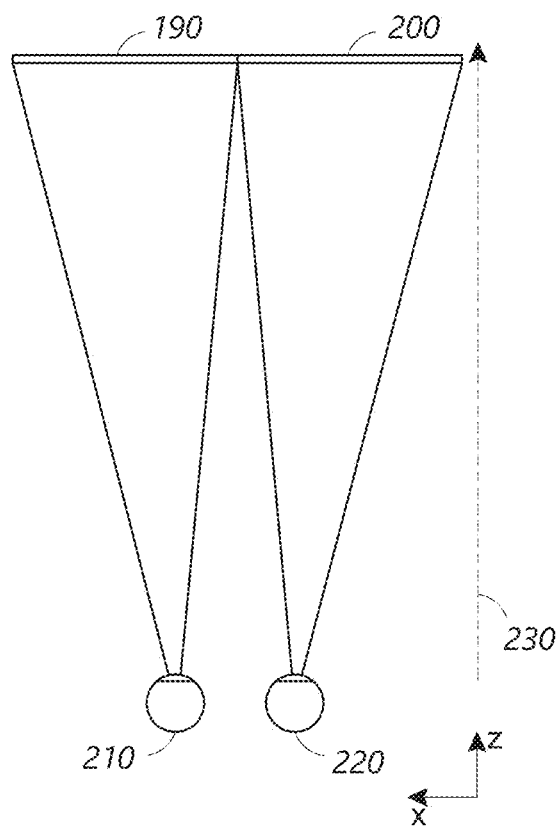
FIG. 3 illustrates a display system for simulating three-dimensional images for a user, according to some embodiments.

The perception of an image as being "three-dimensional" or "3-D" may be achieved by providing slightly different presentations of the image to each eye of the user. FIG. 3 illustrates a display system for simulating 3-D images for a user. Two distinct images 190, 200—one for each eye 210, 220—are output to the user. The images 190, 200 are spaced from the eyes 210, 220 by a distance 230 along an optical or z-axis that is parallel to the line of sight of the user. The images 190, 200 are flat and the eyes 210, 220 may focus on the images by assuming a single accommodated state. Such 3-D display systems rely on the human visual system to combine the images 190, 200 to provide a perception of depth and/or scale for the combined image.

Objects may be perceived as being 3-D due to a combination of vergence and accommodation. Vergence movements (e.g., rotation of the eyes so that the pupils move toward or away from each other to converge the respective lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex," as well as pupil dilation or constriction. Likewise, under normal conditions, a change in vergence will trigger a matching change in accommodation of lens shape and pupil size. As noted herein, many stereoscopic or "3-D" display systems display a scene using slightly different presentations (and, so, slightly different images) to each eye such that a 3-D perspective is perceived by the human visual system. Such systems are uncomfortable for many users, however, since they simply provide images at a single accommodated state and work against the "accommodation-vergence reflex." Display systems that provide a better match between accommodation and vergence may form more realistic and comfortable simulations of 3-D images.

Figure 4:
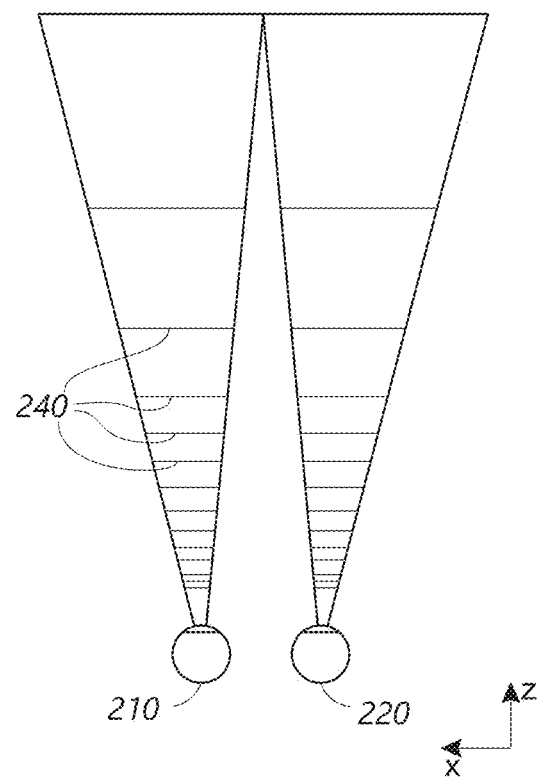
FIG. 4 illustrates aspects of an approach for simulating three-dimensional image data using multiple depth planes, according to some embodiments.

FIG. 4 illustrates aspects of an approach for simulating 3-D images using multiple depth planes. With reference to FIG. 4, the eyes 210, 220 assume different accommodated states to focus on objects at various distances on the z-axis. Consequently, a particular accommodated state may be said to be associated with a particular one of the illustrated depth planes 240, which has an associated focal distance, such that objects or parts of objects in a particular depth plane are in focus when the eyes 210, 220 are in the accommodated state for that depth plane. In some embodiments, 3-D images may be simulated by providing different presentations of an image for each of the eyes 210, 220, and/or by providing different presentations of the image corresponding to multiple depth planes. While the fields of view of the eyes 210, 220 are shown as being separate for clarity of illustration, they may overlap, for example, as distance along the z-axis increases. In addition, while the depth planes are shown as being flat for ease of illustration, it will be appreciated that the contours of a depth plane may be curved in physical space, such that all features in a depth plane are in focus with the eye in a particular accommodated state.

Figure 5A:
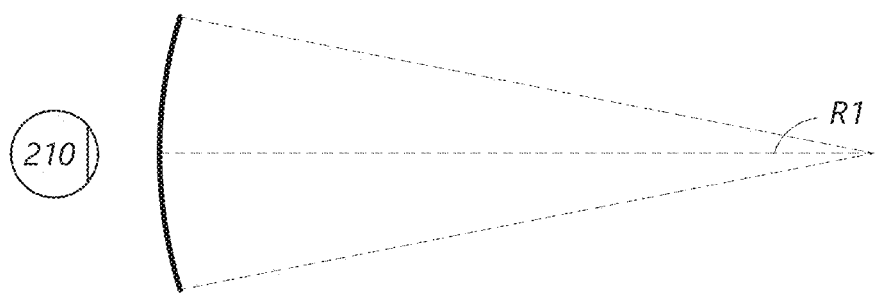
FIGS. 5A-5C illustrate relationships between radius of curvature and focal radius.
Figure 5B:
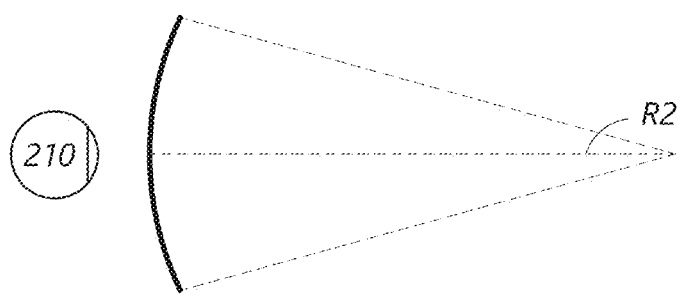
Figure 5C:
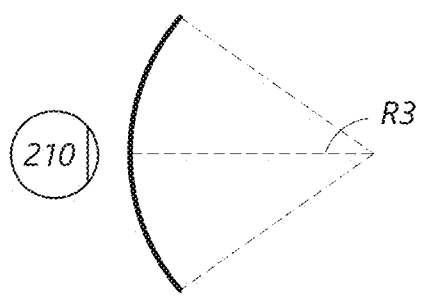

The distance between an object and an eye 210, 220 may also change the amount of divergence of light from that object, as viewed by that eye. FIGS. 5A-5C illustrate relationships between distance and the divergence of light rays. The distance between the object and the eye 210 is represented by, in order of decreasing distance, R1, R2, and R3. As shown in FIGS. 5A-5C, the light rays become more divergent as distance to the object decreases. As distance increases, the light rays become more collimated. Stated another way, it may be said that the light field produced by a point (the object or a part of the object) has a spherical wavefront curvature, which is a function of how far away the point is from the eye 210. The curvature increases with decreasing distance between the object and the eye 210. Consequently, at different depth planes, the degree of divergence of light rays is also different, with the degree of divergence increasing with decreasing distance between depth planes and the eye 210. While only a single eye 210 is illustrated for clarity of illustration in FIGS. 5A-5C and other figures herein, it will be appreciated that the discussions regarding the eye 210 may be applied to both of the user's eyes 210, 220.

The human eye can interpret a finite number of depth planes to provide depth perception. Consequently, a highly believable simulation of perceived depth may be achieved by providing, to the eyes, different presentations of an image corresponding to each of a limited number of depth planes. The different presentations may be separately focused by the user's eyes, thereby helping to provide the user with depth cues based on the accommodation of the eye required to bring into focus different image features for the scene located on different depth planes and/or based on observing different image features on different depth planes being out of focus.

Example of a Waveguide Stack Assembly for an AR or MR Eyepiece Display

Figure 6:
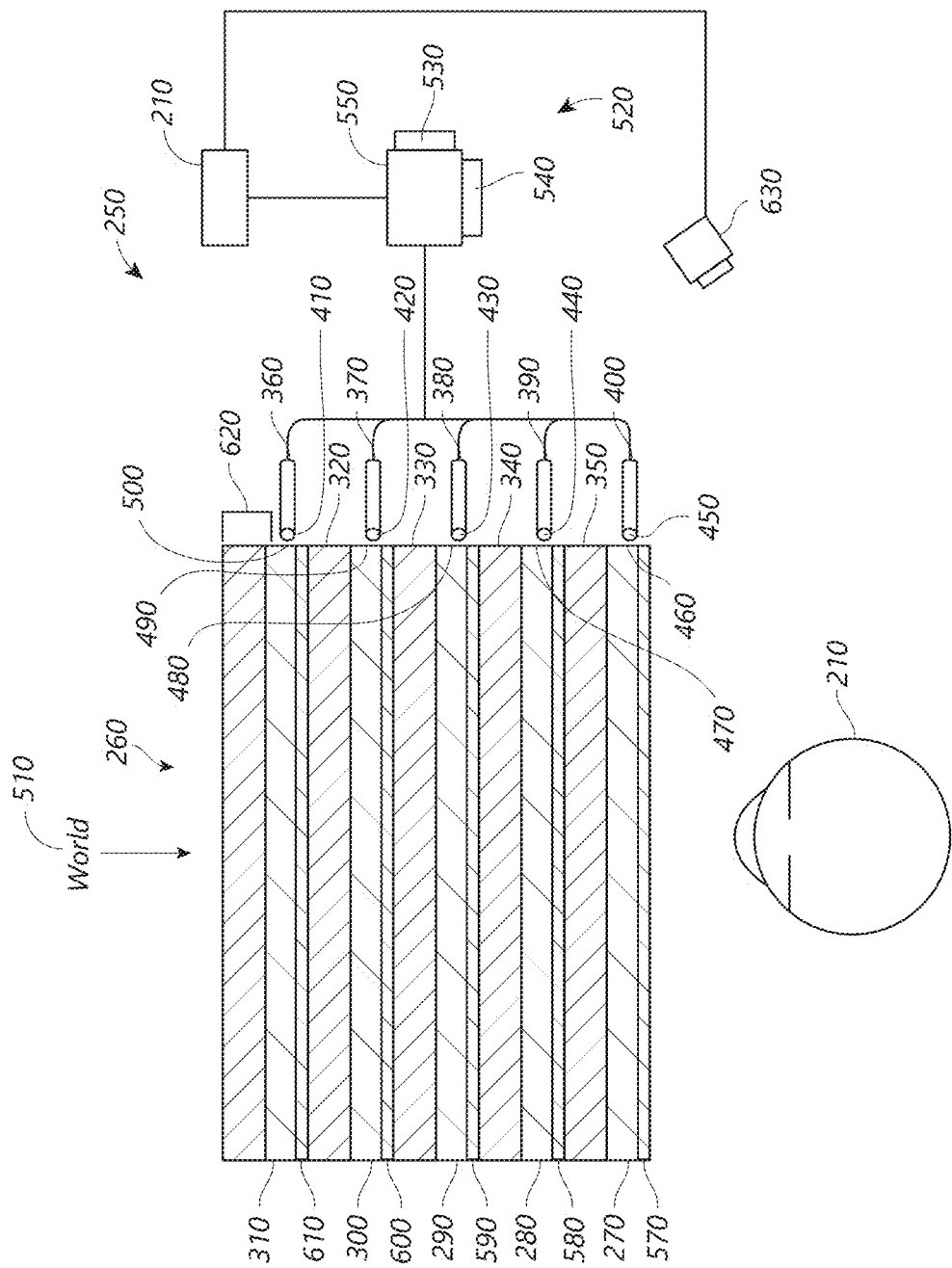
FIG. 6 illustrates an example of a waveguide stack in an AR eyepiece for outputting image information to a user, according to some embodiments.

FIG. 6 illustrates an example of a waveguide stack for outputting image information to a user in an AR eyepiece display 70, according to some embodiments. A display system 250 includes a stack of waveguides, or stacked waveguide assembly, 260 that may be utilized to provide 3-D perception to the eye/brain using a plurality of waveguides 270, 280, 290, 300, 310. In some embodiments, the display system 250 is the AR display system 60 of FIG. 2, with FIG. 6 schematically showing some parts in greater detail. For example, the stacked waveguide assembly 260 may be part of the eyepiece display 70 of FIG. 2. It will be appreciated that the display system 250 may be considered a light field display.

The stacked waveguide assembly 260 may also include one or more features 320, 330, 340, 350 between the waveguides 270, 280, 290, 300, 310. In some embodiments, the features 320, 330, 340, 350 may be one or more lenses. The waveguides 270, 280, 290, 300, 310 and/or the lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides 270, 280, 290, 300, 310 and may be utilized to inject image information into the waveguides, each of which may be configured to distribute incoming light across each respective waveguide for output toward the eye 210. Light exits an output surface 410, 420, 430, 440, 450 of each respective image injection device 360, 370, 380, 390, 400 and is injected into a corresponding input surface 460, 470, 480, 490, 500 of the respective waveguides 270, 280, 290, 300, 310. In some embodiments, the each of the input surfaces 460, 470, 480, 490, 500 may be an edge of a corresponding waveguide, or may be part of a major surface of the corresponding waveguide (that is, one of the waveguide surfaces directly facing the world 510 or the user's eye 210). In some embodiments, beams of light may be injected into each waveguide and may be replicated, such as by sampling into beamlets by diffraction, in the waveguide and then directed toward the eye 210 with an amount of optical power corresponding to the depth plane associated with that particular waveguide. In some embodiments, a single one of the image injection devices 360, 370, 380, 390, 400 may be associated with, and inject light into, a plurality (e.g., three) of the waveguides 270, 280, 290, 300, 310.

In some embodiments, the image injection devices 360, 370, 380, 390, 400 are discrete displays that each produce images for injection into a corresponding waveguide 270, 280, 290, 300, 310, respectively. The images provided by the image injection devices 360, 370, 380, 390, 400 may include light of different wavelengths, or colors.

In some embodiments, the light injected into the waveguides 270, 280, 290, 300, 310 is provided by a light projector system 520, which includes a light source 530, such as a light emitting diode (LED). The light from the light source 530 may be directed to, and modulated by, a light modulator 540 (e.g., a spatial light modulator (SLM)), via a beamsplitter (BS) 550. The light modulator 540 may spatially and/or temporally change the perceived intensity of the light injected into the waveguides 270, 280, 290, 300, 310. Examples of SLMs include liquid crystal displays (LCD), such as liquid crystal on silicon (LCOS) displays, and digital light processing (DLP) displays.

In some embodiments, the light projector system 520, or one or more components thereof, may be attached to the frame 80 shown in FIG. 2. For example, the light projector system 520 may be part of a temporal portion (e.g., ear stem) of the frame 80 or disposed at an edge of the eyepiece display 70. In some embodiments, the light source 530 may be separate from the BS 550 and/or the light modulator 540.

A controller 560 controls the operation of the stacked waveguide assembly 260, including operation of the image injection devices 360, 370, 380, 390, 400, the light source 530, and the light modulator 540. In some embodiments, the controller 560 is part of the local processing and data module 140. The controller 560 includes programming (e.g., instructions in a non-transitory medium) that regulates the timing and provision of images to the waveguides 270, 280, 290, 300, 310. In some embodiments, the controller may be a single integral device, or a distributed system connected by wired or wireless communication channels. In some embodiments, the controller 560 may be part of the processing modules 140 or 150 shown in FIG. 2.

The waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements 570, 580, 590, 600, 610 may also be referred to light extracting optical elements. Extracted beams of light may be output by the waveguide at locations at which the light propagating in the waveguide strikes light extracting optical elements. The out-coupling optical elements 570, 580, 590, 600, 610 may be, for example, diffractive optical elements, including diffractive gratings, as discussed further herein. While the out-coupling optical elements 570, 580, 590, 600, 610 are illustrated as being disposed at the bottom major surfaces of the waveguides 270, 280, 290, 300, 310, in some embodiments they may be disposed at the top and/or bottom major surfaces, and/or may be disposed directly in the volume of the waveguides 270, 280, 290, 300, 310. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

Each waveguide 270, 280, 290, 300, 310 may output light corresponding to a particular depth plane. For example, the waveguide 270 nearest the eye may deliver collimated beams of light to the eye 210. The collimated beams of light may be representative of the optical infinity focal plane. The next waveguide up 280 may output collimated beams of light which pass through the first lens 350 (e.g., a negative lens) before reaching the eye 210. The first lens 350 may add a slight convex wavefront curvature to the collimated beams so that the eye/brain interprets light coming from the waveguide 280 as originating from a first focal plane closer inward toward the eye 210 from optical infinity. Similarly, the third waveguide 290 passes its output light through both the first lens 350 and the second lens 340 before reaching the eye 210. The combined optical power of the first lens 350 and the second lens 340 may add another incremental amount of wavefront curvature so that the eye/brain interprets light coming from the third waveguide 290 as originating from a focal plane that is even closer inward from optical infinity than was light from the second waveguide 280.

The other waveguide layers 300, 310 and lenses 330, 320 are similarly configured, with the highest waveguide 310 in the stacked waveguide assembly 260 sending its output through all of the lenses 320, 330, 340, 350 between it and the eye 210 for an aggregate focal power representative of the closest focal plane to the user. To compensate for the stack of lenses 320, 330, 340, 350 when viewing light coming from the world 510 on the other side of the stacked waveguide assembly 260, a compensating lens layer 620 may be disposed at the top of the stack to compensate for the aggregate optical power of the lens stack 320, 330, 340, 350 below. Such a configuration provides as many perceived focal planes as there are available waveguide/lens pairings. Both the out-coupling optical elements 570, 580, 590, 600, 610 of the waveguides 270, 280, 290, 300, 310 and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may output images set to the same depth plane, or multiple subsets of the waveguides 270, 280, 290, 300, 310 may output images set to the same plurality of depth planes, with one set for each depth plane. This can provide advantages for forming a tiled image to provide an expanded field of view at those depth planes.

The out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the out-coupling optical elements 570, 580, 590, 600, 610 may be volumetric or surface features, which may be configured to output light at specific angles. For example, the out-coupling optical elements 570, 580, 590, 600, 610 may be volume holograms, surface holograms, and/or diffraction gratings. In some embodiments, the features 320, 330, 340, 350 may not be lenses; rather, they may simply be spacers (e.g., cladding layers and/or structures for forming air gaps).

In some embodiments, the out-coupling optical elements 570, 580, 590, 600, 610 are diffractive elements with a sufficiently low diffractive efficiency such that only a portion of the power of the light in a beam is re-directed toward the eye 210 with each interaction, while the rest continues to move through a waveguide via TIR. Accordingly, the exit pupil of the light source 530 is replicated across the waveguide to create a plurality of output beams carrying the image information from the light source 530, effectively expanding the area from which the eye 210 can view the exit pupil of the light source 530. These diffractive elements may also have a variable diffractive efficiency across their geometry to improve uniformity of light output by the waveguide.

In some embodiments, one or more diffractive elements may be switchable between "on" states in which they actively diffract, and "off" states in which they do not significantly diffract. For instance, a switchable diffractive element may include a layer of polymer dispersed liquid crystal in which microdroplets form a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and IR light cameras) may be provided to capture images of the eye 210, parts of the eye 210, or at least a portion of the tissue surrounding the eye 210 to, for example, detect user inputs, extract biometric information from the eye 210, estimate and track the gaze direction of the eye 210, to monitor the physiological state of the user, etc. In some embodiments, the camera assembly 630 may include an image capture device and a light source to project light (e.g., IR or near-IR light) to the eye 210, which may then be reflected by the eye 210 and detected by the image capture device. In some embodiments, the light source includes light emitting diodes ("LEDs"), emitting in IR or near-IR. In some embodiments, the camera assembly 630 may be attached to the frame 80 shown in FIG. 2 and may be in electrical communication with the processing modules 140 or 150, which may process image information from the camera assembly 630 to make various determinations regarding, for example, the physiological state of the user, the gaze direction of the wearer, iris identification, etc. In some embodiments, one camera assembly 630 may be utilized for each eye, to separately monitor each eye.

Figure 7A:
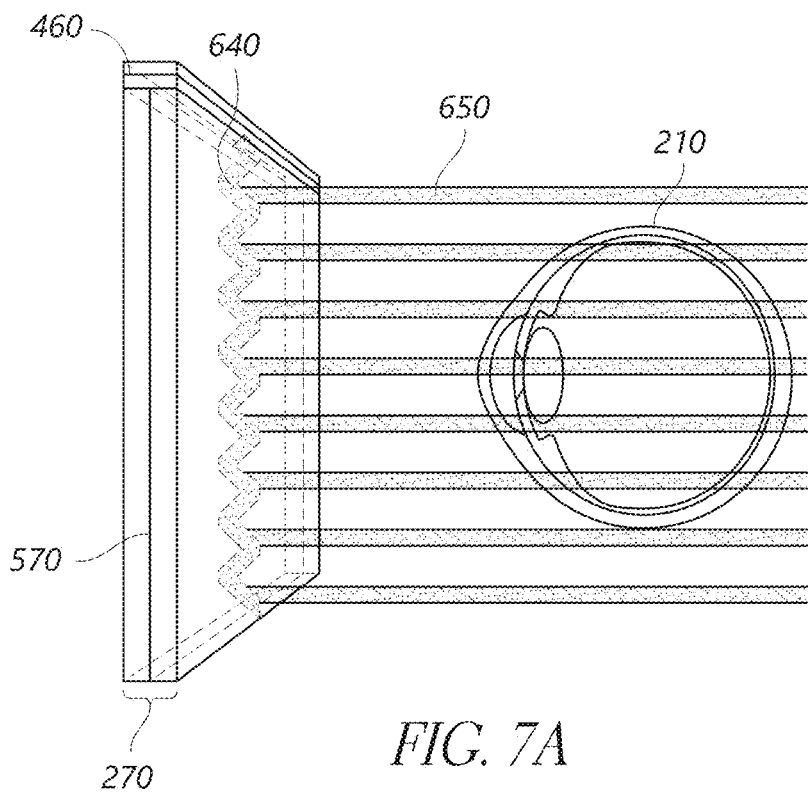
FIGS. 7A-7B illustrate examples of exit beams output from a waveguide, according to some embodiments.
Figure 7B:
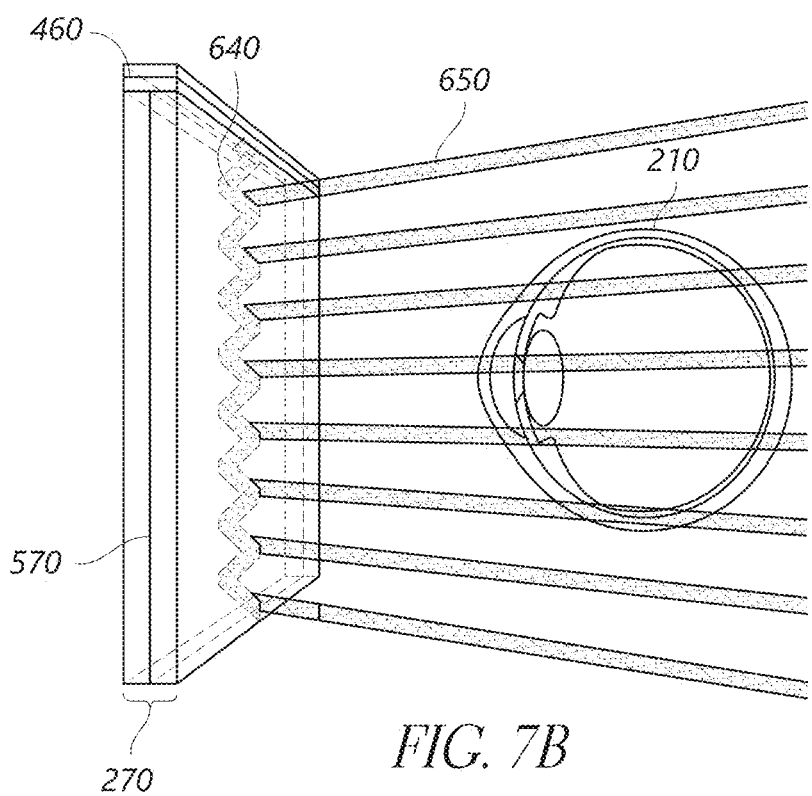

FIG. 7A illustrates an example of exit beams output from a waveguide, in some embodiments. One waveguide is illustrated (with a perspective view), but other waveguides in the waveguide assembly 260 of FIG. 6 may function similarly. Light 640 is injected into the waveguide 270 at the input surface 460 of the waveguide 270 and propagates within the waveguide 270 by TIR. Through interaction with diffractive elements, light exits the waveguide as exit beams 650. The exit beams 650 replicate the exit pupil from a projector device which projects images into the waveguide. Any one of the exit beams 650 includes a sub-portion of the total energy of the input light 640. The exit beams 650 are illustrated as being substantially parallel in FIG. 7A but, as discussed herein, some amount of optical power may be imparted depending on the depth plane associated with the waveguide 270. Parallel exit beams may be indicative of a depth plane at a large distance (e.g., optical infinity) from the eye 210. Other waveguides or other sets of out-coupling optical elements may output an exit beam pattern that is more divergent, as shown in FIG. 7B, which would require the eye 210 to accommodate to bring it into focus on the retina and would be interpreted by the brain as light from a distance closer to the eye 210 than optical infinity.

Figure 8:
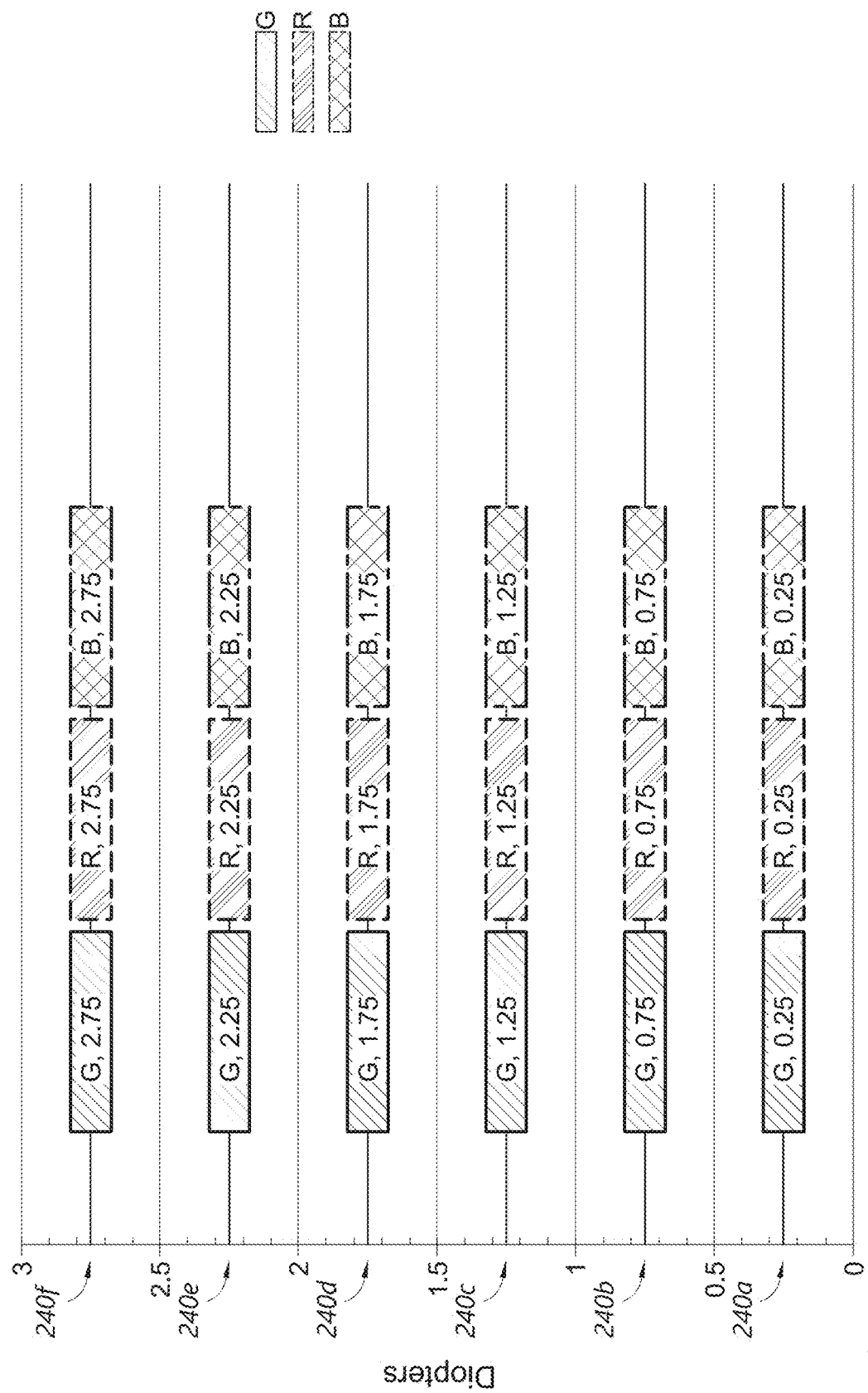
FIG. 8 illustrates an example of a stacked waveguide assembly in which each depth plane includes images formed using multiple different component colors, according to some embodiments.

In some embodiments, a full color image may be formed at each depth plane by overlaying images in each of the component colors (e.g., three or more component colors, such as red, green, and blue). FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have, for example, three component color images associated with it, including: a first image of a first color, G; a second image of a second color, R; and a third image of a third color, B. Different depth planes are indicated in the figure by different diopter powers following the letters G, R, and B. The numbers following each of these letters indicate diopters (1/m), or inverse distance of the depth plane from a user, and each box in the figure represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort or may decrease chromatic aberrations.

In some embodiments, light of each component color may be output by a single dedicated waveguide and, consequently, each depth plane may have multiple waveguides associated with it. In such embodiments, each box in the figure may be understood to represent an individual waveguide, and three waveguides may be provided per depth plane so as to display three component color images per depth plane. While the waveguides associated with each depth plane are shown adjacent to one another in this drawing for ease of illustration, it will be appreciated that, in a physical device, the waveguides may all be arranged in a stack with one waveguide per level. In some other embodiments, multiple component colors may be output by the same waveguide, such that, for example, only a single waveguide may be provided per depth plane.

With continued reference to FIG. 8, in some embodiments, G is the color green, R is the color red, and B is the color blue. In some other embodiments, other colors associated with other wavelengths of light, such as yellow, magenta and cyan, may be used in addition to or may replace one or more of red, green, or blue. In some embodiments, features 320, 330, 340, and 350 may be active or passive optical filters configured to block or selectively pass light from the ambient environment to the user's eyes.

References to a given color of light throughout this disclosure should be understood to encompass light of one or more wavelengths within a range of wavelengths of light that are perceived by a user as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 of FIG. 6 may be configured to emit light of one or more wavelengths outside the visual perception range of the user, for example, IR or ultraviolet wavelengths. IR light can include light with wavelengths in a range from 700 nm to 10 µm. In some embodiments, IR light can include near-IR light with wavelengths in a range from 700 nm to 1.5 µm. In addition, the in-coupling, out-coupling, and other light redirecting structures of the waveguides of the display system 250 may be configured to direct and emit this light out of the display towards the user's eye 210, e.g., for imaging or user stimulation applications.

Figure 9A:
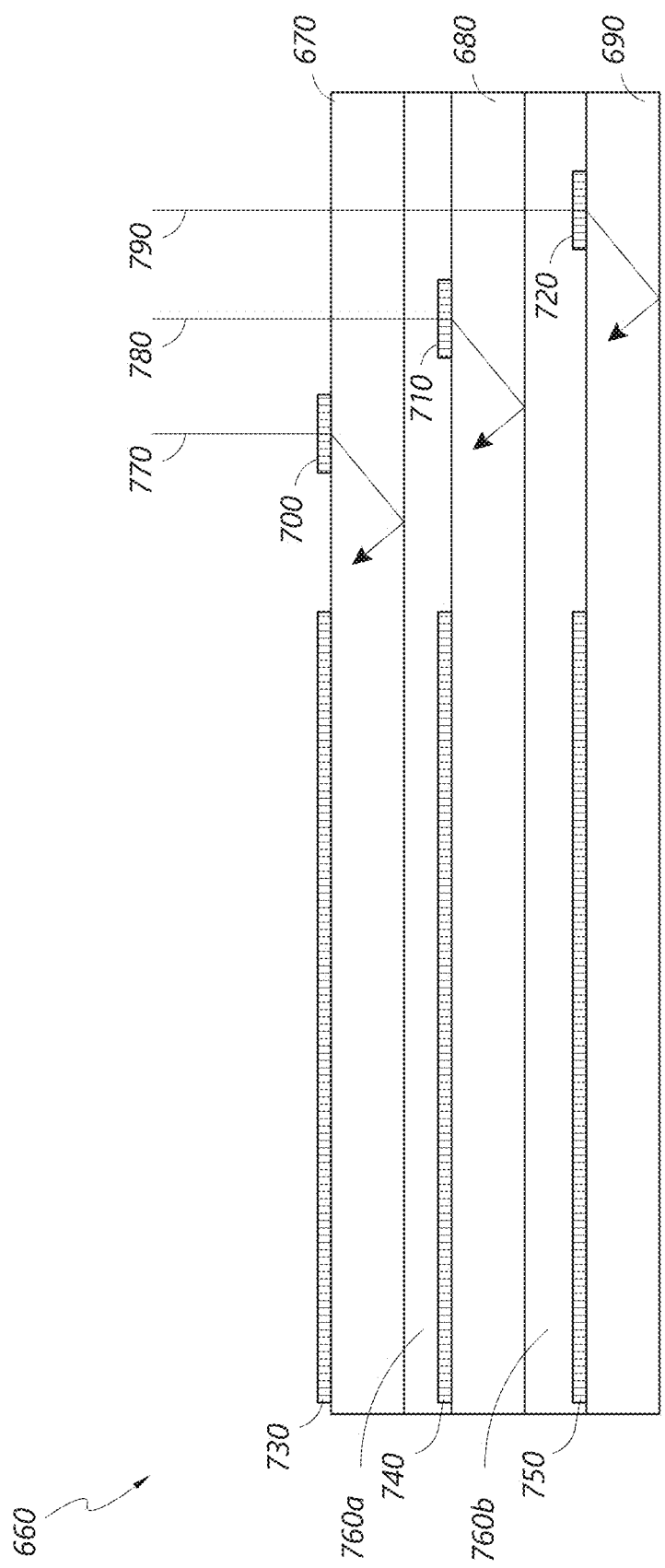
FIG. 9A illustrates a cross-sectional side view of an example of a set of stacked waveguides that each includes an in-coupling optical element, according to some embodiments.

With reference now to FIG. 9A, in some embodiments, light impinging on a waveguide may need to be redirected so as to in-couple the light into the waveguide. An in-coupling optical element may be used to redirect and in-couple the light into its corresponding waveguide. FIG. 9A illustrates a cross-sectional side view of an example of a set of stacked waveguides 660 that each includes an in-coupling optical element. The waveguides may each be configured to output light of one or more different wavelengths, or one or more different ranges of wavelengths. It will be appreciated that the stack 660 may correspond to the stack 260 of FIG. 6 and the illustrated waveguides of the stack 660 may correspond to some of waveguides 270, 280, 290, 300, 310, except that light from one or more of the image injection devices 360, 370, 380, 390, 400 is injected into the waveguides from a position or orientation that requires light to be redirected for in-coupling.

The illustrated set of stacked waveguides 660 includes waveguides 670, 680, and 690. Each waveguide includes an associated in-coupling optical element (which may also be referred to as a light input area on the waveguide), with, for example, in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, for example, light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750 may be disposed on a bottom major surface of associated waveguides 670, 680, 690, respectively. In some other embodiments, the light distributing elements 730, 740, 750 may be disposed on both top and bottom major surface of associated waveguides 670, 680, 690 respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, for example, gas, liquid, or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is at least 0.05, or at least 0.10, less than the refractive index of the material forming the waveguides 670, 680, 690. Advantageously, the lower refractive index layers 760a, 760b may function as cladding layers that facilitate TIR of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

In some embodiments, for ease of manufacturing and other considerations, the materials forming the waveguides 670, 680, 690 are similar or the same, and the materials forming the layers 760a, 760b are similar or the same. In other embodiments, the material forming the waveguides 670, 680, 690 may be different between one or more waveguides, or the material forming the layers 760a, 760b may be different, while still holding to the various refractive index relationships noted above.

As shown in FIG. 9A, light rays 770, 780, 790 are incident on the set of waveguides 660. In some embodiments, the light rays 770, 780, 790 have different properties (e.g., different wavelengths or different ranges of wavelengths), which may correspond to different colors. The in-coupling optical elements 700, 710, 720 each re-direct the incident light such that the light propagates through a respective one of the waveguides 670, 680, 690 by TIR.

For example, in-coupling optical element 700 may be configured to re-direct ray 770, which has a first wavelength or range of wavelengths. Similarly, transmitted ray 780 impinges on and is re-directed by in-coupling optical element 710, which is configured to re-direct light of a second wavelength or range of wavelengths. Likewise, ray 790 is re-directed by in-coupling optical element 720, which is configured to selectively re-direct light of third wavelength or range of wavelengths.

With continued reference to FIG. 9A, light rays 770, 780, 790 are re-directed so that they propagate through a corresponding waveguide 670, 680, 690; that is, the in-coupling optical element 700, 710, 720 of each waveguide re-directs light into that corresponding waveguide 670, 680, 690 to in-couple light into that corresponding waveguide. The light rays 770, 780, 790 are re-directed at angles that cause the light to propagate through the respective waveguide 670, 680, 690 by TIR. The light rays 770, 780, 790 propagate through the respective waveguide 670, 680, 690 by TIR until interacting with the waveguide's corresponding light distributing elements 730, 740, 750.

Figure 9B:
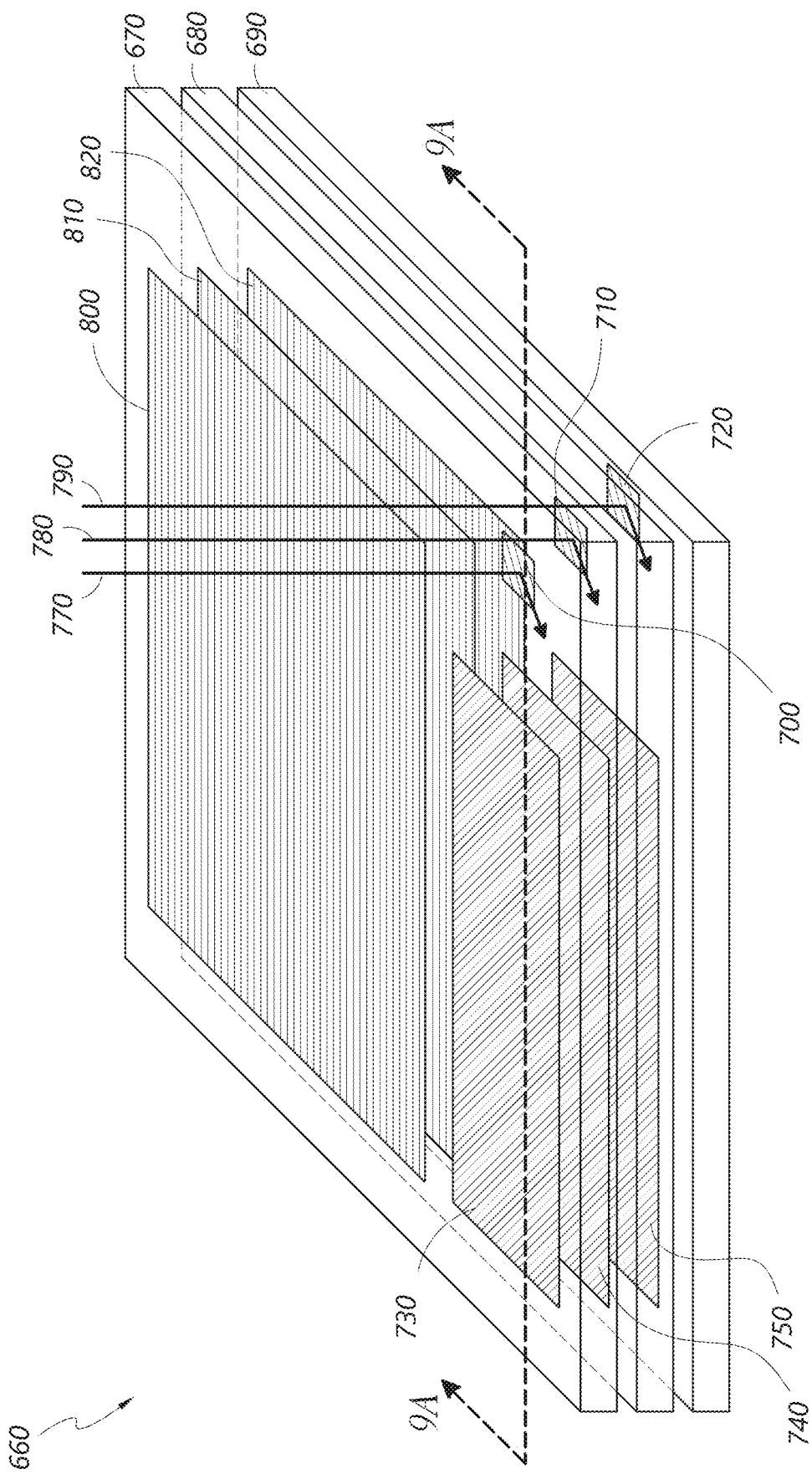
FIG. 9B illustrates a perspective view of an example of the stacked waveguides of FIG. 9A, according to some embodiments.

With reference now to FIG. 9B, a perspective view of an example of the stacked waveguides of FIG. 9A is illustrated. As noted above, the light rays 770, 780, 790, are in-coupled by the in-coupling optical elements 700, 710, 720, respectively, and then propagate by TIR within the waveguides 670, 680, 690, respectively. The light rays 770, 780, 790 then interact with the light distributing elements 730, 740, 750, respectively. The light distributing elements 730, 740, 750 re-direct the light rays 770, 780, 790 so that they propagate towards the out-coupling optical elements 800, 810, and 820, respectively.

In some embodiments, the light distributing elements 730, 740, 750 are orthogonal pupil expanders (OPEs). In some embodiments, the OPEs both re-direct light to the out-coupling optical elements 800, 810, 820 and also expand the pupil associated with this light by sampling the light rays 770, 780, 790 at many locations across the light distributing elements 730, 740, 750 as they propagate to the out-coupling optical elements. In some embodiments (e.g., where the exit pupil is already of a desired size), the light distributing elements 730, 740, 750 may be omitted and the in-coupling optical elements 700, 710, 720 may be configured to re-direct light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EPs) or exit pupil expanders (EPEs) that re-direct light out of the waveguides and toward a user's eye 210, as shown in FIGS. 7A and 7B). The OPEs may be configured to increase the dimensions of the eye box in at least one axis and the EPEs may be configured to increase the eye box in an axis crossing (e.g., orthogonally crossing) the axis of the OPEs.

Accordingly, with reference to FIGS. 9A and 9B, in some embodiments, the set 660 of waveguides includes waveguides 670, 680, 690; in-coupling optical elements 700, 710, 720; light distributing elements (e.g., OPEs) 730, 740, 750; and out-coupling optical elements (e.g., EPEs) 800, 810, 820 for each component color. The waveguides 670, 680, 690 may be stacked with an air gap/cladding layer between each one. The in-coupling optical elements 700, 710, 720 re-direct incident light into a corresponding waveguide, with different in-coupling optical elements receiving light of different wavelengths. The light then propagates at angles which support TIR within the respective waveguide 670, 680, 690. Since TIR only occurs for a certain range of angles, the range of propagation angles of the light rays 770, 780, 790 is limited. The range of angles which support TIR may be thought of in such an example as the angular limits of the field of view which can be displayed by the waveguides 670, 680, 690.

In the example shown, light ray 770 (e.g., blue light) is in-coupled by the first in-coupling optical element 700, and then continues to reflect back and forth from the surfaces of the waveguide while traveling down the waveguide, with the light distributing element (e.g., OPE) 730 progressively sampling it to create additional replicated rays which are directed toward the out-coupling optical element (e.g., EPE) 800, in a manner described earlier. The light rays 780 and 790 (e.g., green and red light, respectively) will pass through the waveguide 670, with light ray 780 impinging on and being in-coupled by in-coupling optical element 710. The light ray 780 then propagates down the waveguide 680 via TIR, proceeding on to its light distributing element (e.g., OPE) 740 and then the out-coupling optical element (e.g., EPE) 810. Finally, light ray 790 (e.g., red light) passes through the waveguides 670, 680 to impinge on the light in-coupling optical element 720 of the waveguide 690. The light in-coupling optical element 720 in-couples the light ray 790 such that the light ray propagates to light distributing element (e.g., OPE) 750 by TIR, and then to the out-coupling optical element (e.g., EPE) 820 by TIR. The out-coupling optical element 820 then finally out-couples the light ray 790 to the user, who also receives the out-coupled light from the other waveguides 670, 680.

Figure 9C:
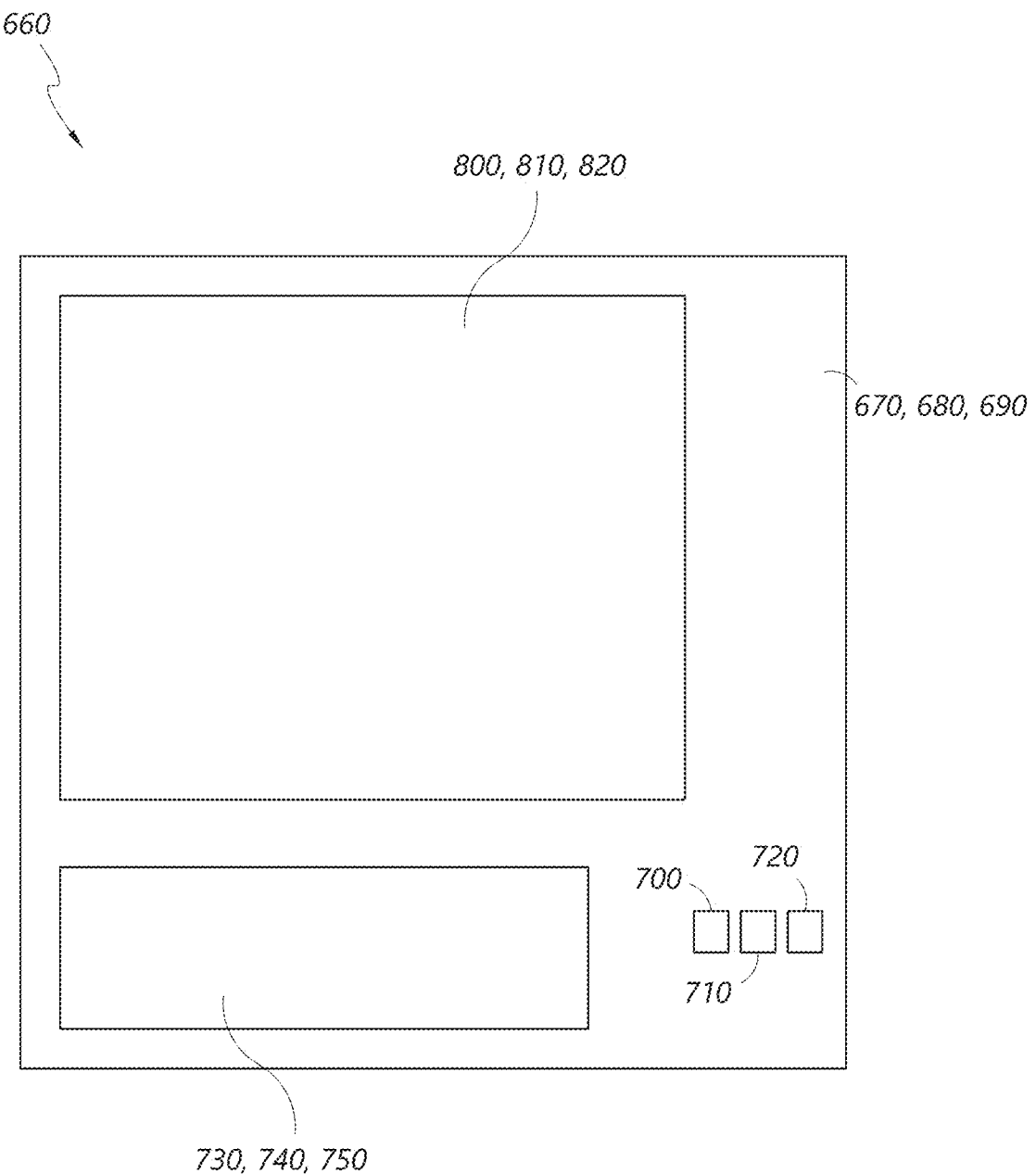
FIG. 9C illustrates a top-down plan view of an example of the stacked waveguides of FIGS. 9A and 9B, according to some embodiments.

FIG. 9C illustrates a top-down plan view of an example of the stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements may be laterally non-overlapping (e.g., laterally spaced apart as seen in the top-down view). This non-overlapping spatial arrangement may facilitate the injection of light from different sources into different waveguides on a one-to-one basis, thereby allowing a specific light source to be uniquely optically coupled to a specific waveguide. In some embodiments, arrangements including non-overlapping spatially separated in-coupling optical elements may be referred to as a shifted pupil system, and the in-coupling optical elements within these arrangements may correspond to sub pupils.

Figure 9D:
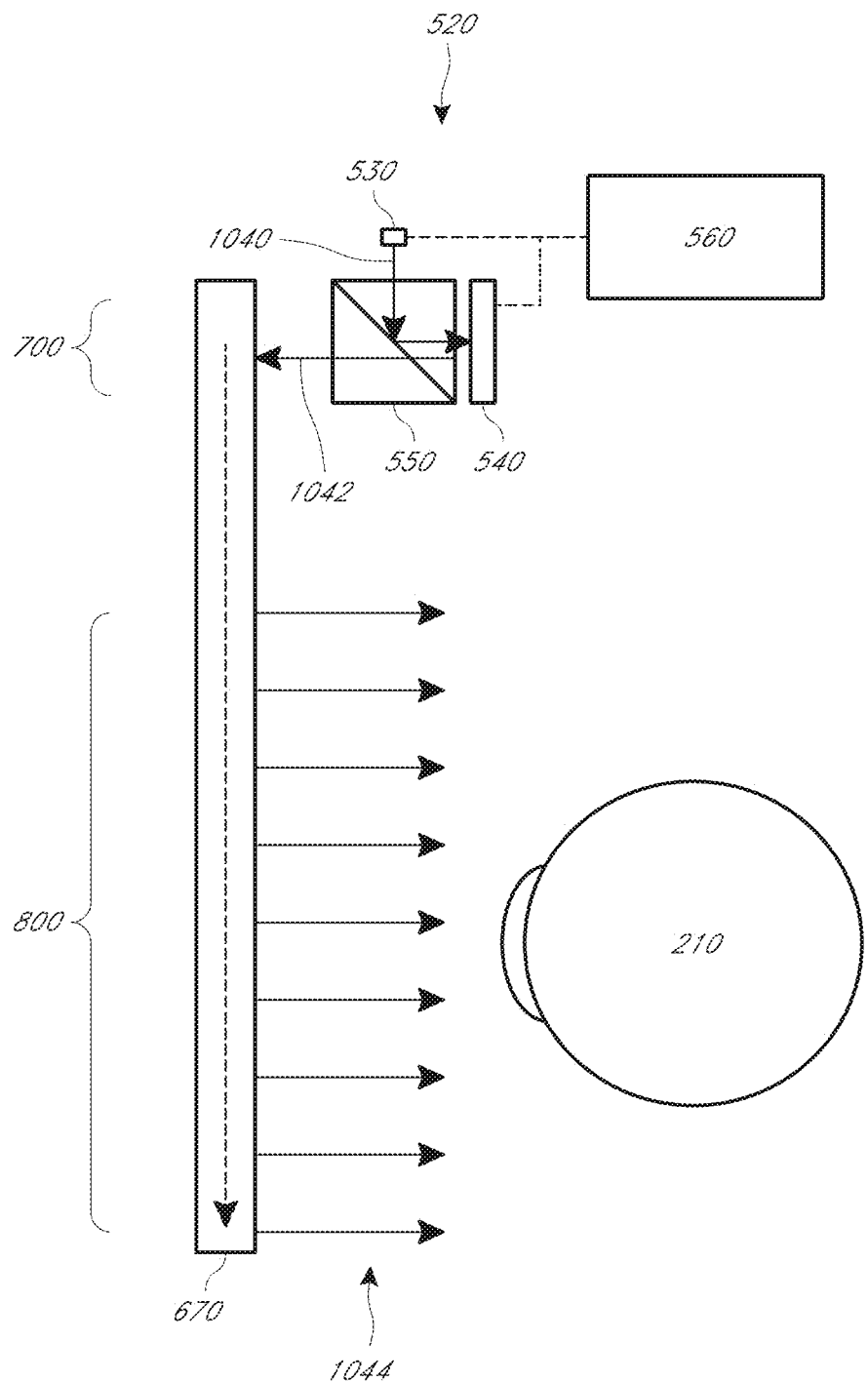
FIG. 9D is a schematic illustration of an image input device inputting light into a waveguide of the eyepiece display, and the waveguide outputting display light toward the eye of the user.

FIG. 9D is a schematic illustration of an image input device inputting light into a waveguide 670 of the eyepiece display 70, and the waveguide 670 outputting display light 1044 toward the eye 210 of the user 90. In the illustrated embodiment, the image input device is a projector system 520, such as the one illustrated in FIG. 6. The projector system 520 can include a light source 530. The light source 530 may be, for example, one or more light emitting diodes, though other types of light sources can also be used (e.g., cold cathode fluorescent lamps, etc.). The projector system 520 can also include a spatial light modulator 540 which is illuminated by the light source 530. The spatial light modulator 540 can be made up of a two-dimensional array of pixels which can be individually controlled so as to regulate a characteristic (e.g., luminance) of the light which is input into the eyepiece display 70 from each pixel. The spatial light modulator 540 can be, for example, an LCD panel, an LCOS panel, a DLP panel, etc.

The spatial light modulator 540 can spatially modulate the light 1040 from the light source 530 in accordance with digital image information. The digital image information can be provided by the display controller 560. The display controller 560 can also control one or more characteristics (e.g., luminance) of the light source 530. For example, the display controller 560 can increase electrical power to the light source 530 in order to increase its luminance, or reduce electrical power to the light source 530 in order to reduce its luminance.

The projector system 520 can also include a beam splitter 550 for directing the light 1040 from the light source 530 toward the spatial light modulator 540, and for directing modulated light 1042 from the spatial light modulator 540 toward the eyepiece display 70. In some embodiments, the projector system 520 (or other image input device) can additionally, or alternatively, include one or more other optical elements, such as lenses, mirrors, filters, prisms, additional light sources of different colors, additional spatial light modulators, etc.

The modulated light 1042 can be directed toward an in-coupling region 700 of the waveguide 670 by the beam splitter 550. The modulated light 1042 then propagates through the waveguide 670 via total internal reflection while being sampled at multiple different locations, as discussed above. Ultimately, the display light 1044 is emitted from an out-coupling region 800 toward the eye 210 of the user 90. Although FIG. 9D illustrates only a single waveguide 670, the eyepiece display 70 can be made up of multiple similar waveguides stacked together, as shown in FIGS. 9A and 9B. Separate waveguides can have different corresponding image input devices (e.g., the projector system 520), or one image input device can serve multiple waveguides of the eyepiece display 70.

Figure 10:
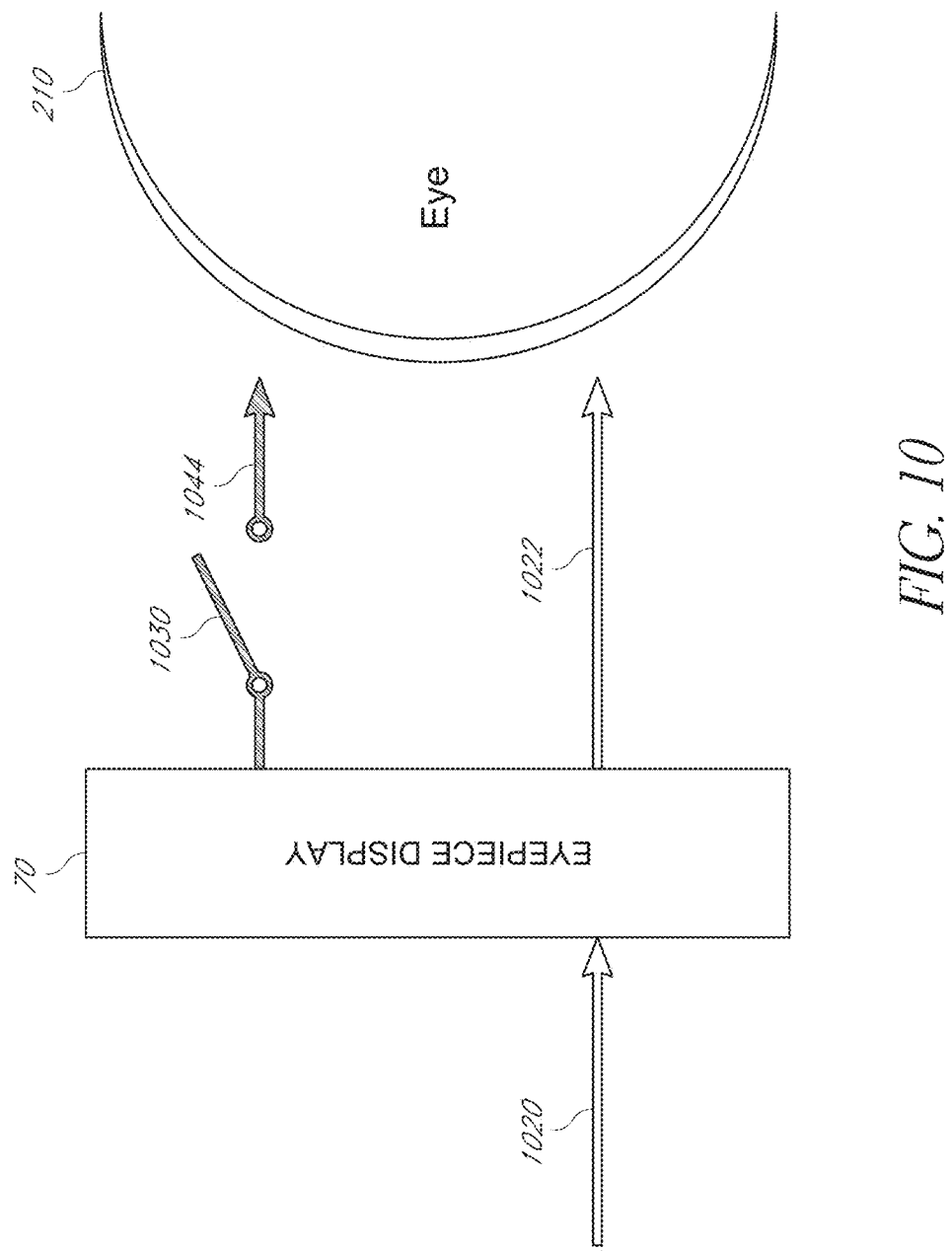
FIG. 10 is a schematic diagram which illustrates operation of the eyepiece display of the AR display system shown in FIG. 2.

Flicker Mitigation when Toggling Display Illumination in Augmented Reality System FIG. 10 is a schematic diagram which illustrates operation of the eyepiece display 70 of the AR display system 60 shown in FIG. 2, according to some embodiments. Ambient light 1020 from the surroundings of the user 90 is incident on the world-side of the eyepiece display 70, opposite the user's eye 210. The eyepiece display 70 can be at least partially transparent to allow the user 90 to observe the ambient light 1020.

In some embodiments, the eyepiece display 70 may filter the ambient light 1020. For example, the eyepiece display 70 may act as a neutral density filter which reduces the luminance of the ambient light 1020 but does not substantially affect its chromaticity. In some embodiments, the eyepiece display 70 may also, or alternatively, substantially alter the chromaticity of the ambient light 1020. Filtered ambient light 1022 is then transmitted to the eye 210 of the user 90, where it is used by the eye to form images of the user's surroundings.

Additionally, as shown in FIG. 9D, the eyepiece display 70 emits the display light 1044 that can be used by the eye 210 to form images which appear to the user 90 to be superimposed on the view of their surroundings through the eyepiece display 70. The images that are formed by the eye 210 using the display light 1044 are referred to herein as virtual content. The luminance of the display light 1044 emitted by the eyepiece display 70 can be varied from a state of maximum luminance to being completely turned off, including all levels in between. The fact that the luminance of the display light 1044 can be modulated is schematically represented in FIG. 10 by a switch 1030 (which can be operable to modulate the luminance of the display light between discrete levels or in a continuously-variable fashion), though, in practice, the task of controlling the display light 1044 can be carried out by, for example, the display controller 560 shown in FIG. 9D. The display controller 560 can modulate the display light 1044 by varying the luminance of the light source 530 and/or by varying the states of the pixels of the spatial light modulator 540.

In summary, the eyepiece display 70 can allow the user 90 to observe light from at least two sources: 1) ambient light 1020 from the surroundings of the user 90; and 2) display light 1044 which is output from the eyepiece display 70 after having been provided by the image input device (e.g., the projector system 520) of the AR display system 60.

Although displaying virtual content is an important purpose of the eyepiece display 70, it may be that there is not a constant need to display virtual content while the AR display system 60 is in operation. There are several reasons why virtual content might not be shown to the user 90 during some period of time. For example, one use of the AR display system 60 is to display virtual objects such that they appear to the user 90 to be positioned at particular locations in the user's surroundings. As the user 90 looks around at their surroundings, however, there may be times when they are looking at a field of view where there is no virtual object. During these periods of time, it may be the case that there is no virtual content to be displayed to the user 90. There may also be other scenarios where there are intervals between the times when various virtual objects are displayed to the user 90 of the AR display system 60.

When there is no virtual content to be shown, the display controller 560 can set every pixel of the spatial light modulator 540 to the darkest state. For example, the display controller 560 can output digital image data consisting of zeros for all the pixels. In this state—where no virtual content is being shown to the user 90—the luminance of the display light 1044 is reduced because the spatial light modulator 540 limits (e.g., by absorption) the amount of the light 1040 from the light source 530 which is input into the eyepiece display 70 and which is ultimately emitted as the display light 1044. In some embodiments, the spatial light modulator 540 may not be able to achieve a 100% contrast ratio and therefore may not be able to completely prevent the light 1040 from the light source 530 from being input into the eyepiece display 70. As a result, the spatial light modulator 540 alone may not be capable of completely eliminating the display light 1044 from being emitted by the eyepiece display 70 even when no virtual content is being shown. In some embodiments, some amount of the display light 1044 is still output from the eyepiece display 70 toward the eye 210 of the user 90 even when every pixel of the spatial light modulator 540 is set to the darkest state. Depending on the ambient lighting conditions, this display light 1044 may be visible to the user 90 as, for example, a dimly lit rectangle.

In situations where no virtual content is being shown to the user 90, it may be advantageous to completely eliminate the display light 1044 by turning off the light source 530 which illuminates the spatial light modulator 540. This would have the benefit of not only completely eliminating the display light 1044 when no virtual content is being shown to the user 90, but also reducing power consumption by the light source 530 and extending battery life. Depending on ambient lighting conditions, however, turning off the light source 530 may result in a user-perceptible change in the display light 1044 being emitted by the eyepiece waveguide 70. This user-perceptible change in the display light 1044 may be distracting and may negatively impact the immersion of the user 90 in the augmented reality experience. Thus, in situations where no virtual content is being shown to the user 90, it may be advantageous to turn off the light source 530 for the eyepiece display 70 only when it is determined that doing so will not be perceptible to the user 90. For example, in some embodiments, when every pixel of the spatial light modulator 540 is set to the darkest state such that no virtual content is being shown to the user 90, the display controller 560 may turn off the light source 530 which illuminates the spatial light modulator only if it is determined that the resulting change in the luminance of the display light 1044 will not be user-perceptible.

Figure 11A:
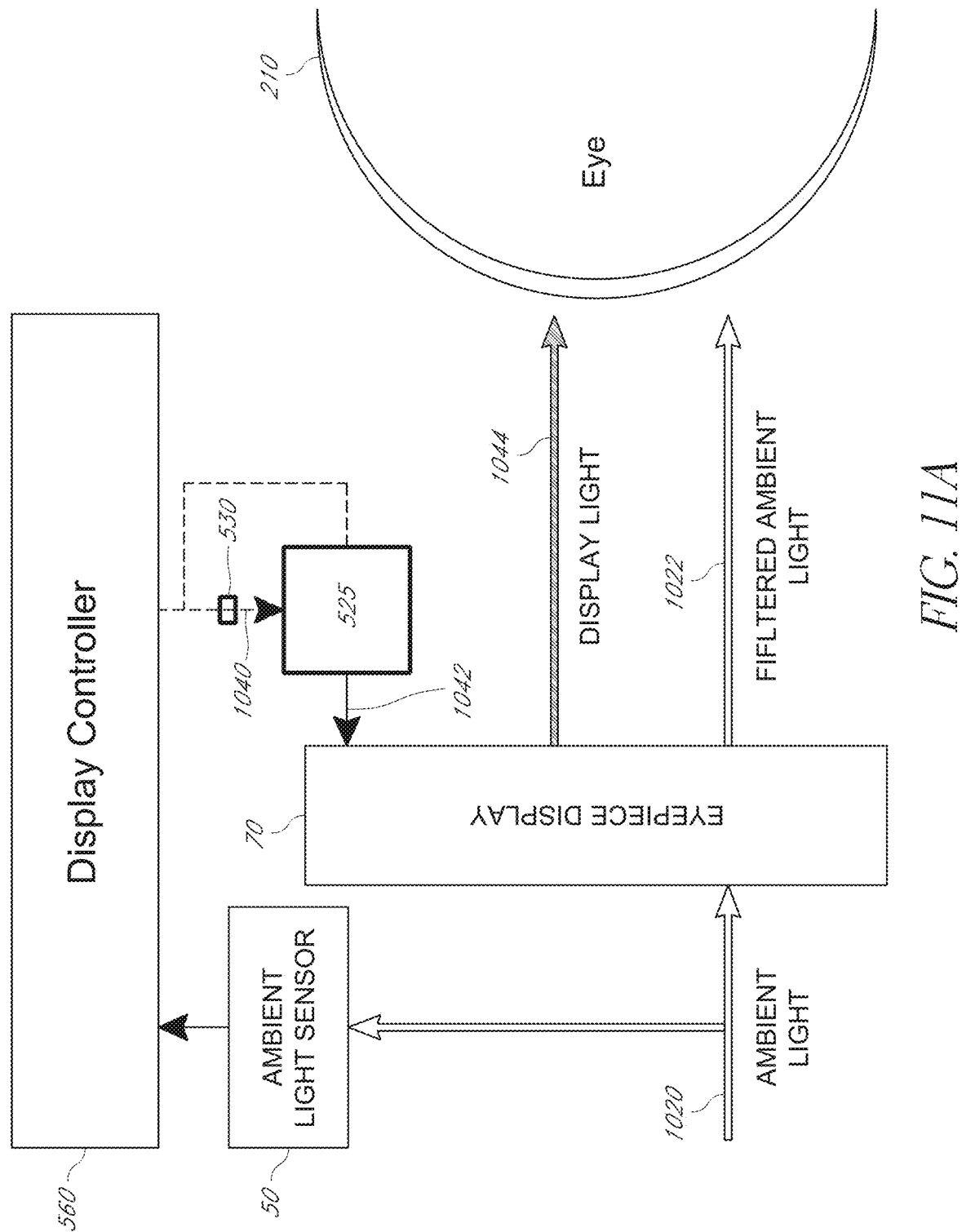
FIGS. 11A and 11B illustrate features of first and second embodiments, respectively, of an augmented reality system which can determine whether turning off the light source for the eyepiece display will result in a user-perceptible change in the display light which is emitted from the eyepiece display in the case where no virtual content is being shown.
Figure 11B:
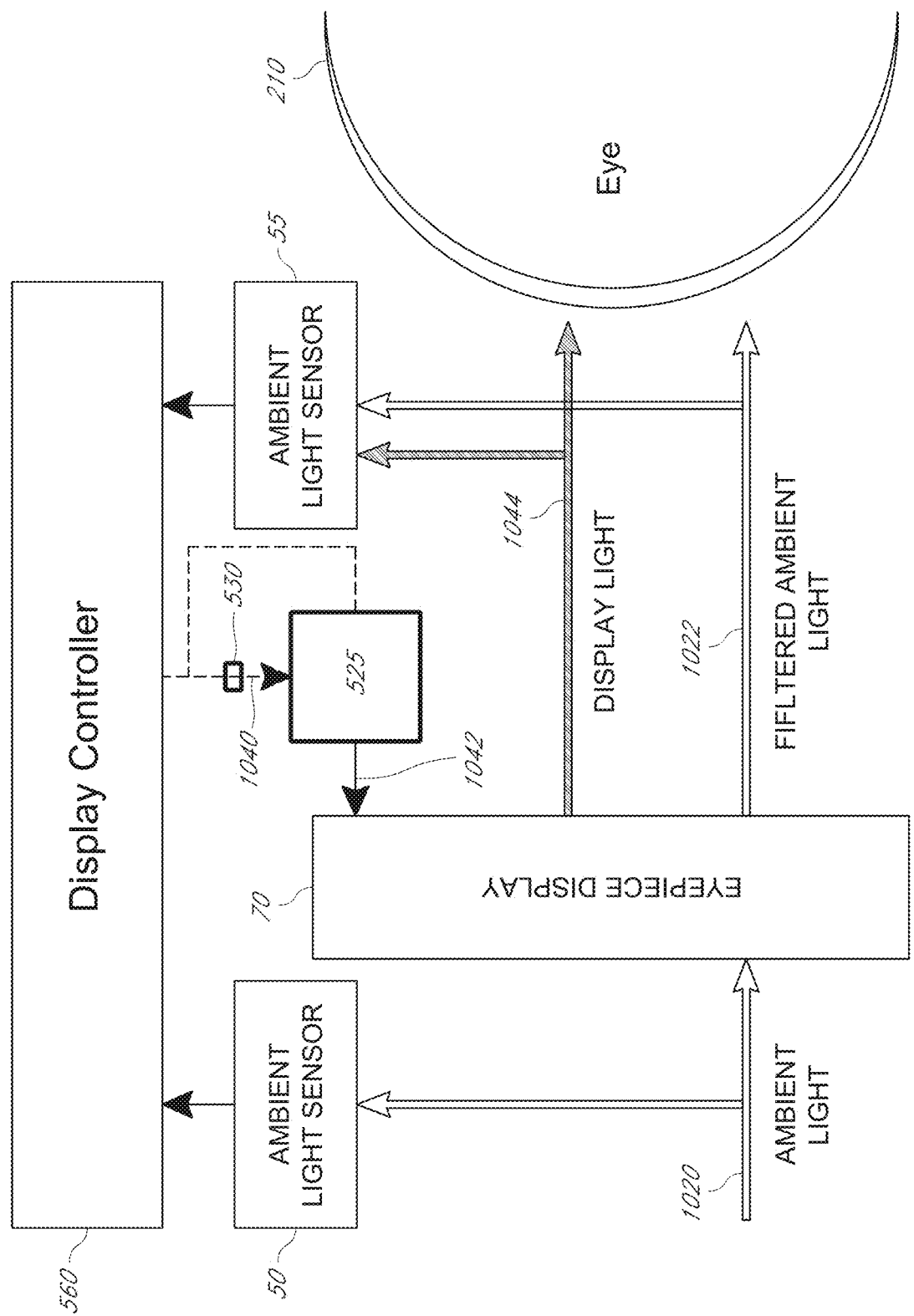

FIGS. 11A and 11B illustrate features of first and second embodiments, respectively, of an augmented reality system 60 which can determine whether turning off the light source 530 for the eyepiece display 70 will result in a user-perceptible change in the display light 1044 which is emitted from the eyepiece display in the case where no virtual content is being shown. Both embodiments of the AR display system 60 include the eyepiece display 70, which is illustrated positioned in front of the eye 210 of the user 90. Both embodiments also include a light source 530 for the eyepiece display 70, an image input device 525, and a display controller 560 for controlling the light source 530 and the image input device 525. As already discussed herein, the light source 530 outputs light 1040 which illuminates a spatial light modulator 540 included in the image input device 525. The image input device 525 then provides modulated light 1042 to the eyepiece display 70, and the eyepiece display 70 ultimately outputs display light 1044.

The FIG. 11A embodiment also includes an ambient light sensor 50 for detecting one or more characteristics of ambient light 1020 from the user's surroundings. In some embodiments, the ambient light sensor 50 is mounted to, for example, the frame 80 of the AR display system 60 in an outward-facing orientation on the world-side of the eyepiece display 70 (as shown in FIG. 2) to detect the ambient light 1020. Measurements of the ambient light 1020 can also, or alternatively, be used to determine one or more characteristics of the filtered ambient light 1022. This can be done by mathematically adjusting the measurements of the ambient light 1020 to compensate for the filtering effects of the eyepiece display 70. The filtering effects of the eyepiece display 70 can be determined and stored, for example, during calibration of the AR display system 60. In some embodiments, the ambient light sensor 50 may be located on the eye-side of the eyepiece display 70, facing the world, to detect the filtered ambient light 1022 which has passed through the eyepiece display 70. In those embodiments, the ambient light sensor 50 can be shielded from detecting the display light 1044 and/or the ambient light sensor 50 can be positioned so as not to detect a substantial amount of the display light 1044. For example, the ambient light sensor 50 may be placed in a position outside the perimeter of the display portion of the eyepiece display 70 (e.g., in a corner of the eyepiece display 70) where little or no display light 1044 is emitted. Although the filtering effects of the display portion of the eyepiece display 70 (i.e., where the display light 1044 is emitted) may be different than the filtering effects of the eyepiece display 70 outside of the display portion, in some embodiments a measurement of the filtered ambient light 1022 outside of the display portion of the eyepiece display 70 can nevertheless be used to approximate a measurement of the filtered ambient light 1022 which is transmitted through the display portion of the eyepiece display 70.

The ambient light sensor 50 can have a light-sensitive element which detects and integrates one or more ambient light characteristics (e.g., ambient light luminance and/or chromaticity) from a solid angle which at least partially overlaps the field of view of the user 90. In some embodiments, the solid angle from which the ambient light sensor 50 detects light can advantageously be matched to the field of view of the user 90. In some embodiments, the ambient light sensor 50 can have multiple light-sensitive elements which detect one or more ambient light characteristics (e.g., ambient light luminance and/or chromaticity) from multiple different directions within the user's field of view.

The ambient light sensor 50 can provide its detection output to the display controller 560 for processing. The detection output of the ambient light sensor 50 may be, for example, one or more measurements of the luminance and/or chromaticity of the ambient light 1020. The detection output of the ambient light sensor 50 can be used to determine whether it will be perceptible to the user 90 to shut off the light source 530 when no virtual content is being displayed by the eyepiece display 70, as discussed further below. The detection output of the ambient light sensor 50 can also be used to maintain a visibility specification where, while displaying virtual content, the luminance of the display light 1044 can be selected based on the luminance of the ambient light 1020 to maintain the visibility of the virtual content.

The FIG. 11B embodiment likewise includes the ambient light sensor 50, but it also includes a display light sensor 55. The display light sensor 55 can be positioned at any location where it can detect the display light 1044 that is emitted toward the user's eye 210 by the eyepiece display 70. For example, the display light sensor 55 can be mounted to the frame 80 of the AR display system 60 on the user-side of the eyepiece display 70, facing the eyepiece display. In addition to detecting the display light 1044 emitted by the eyepiece display 70, the display light sensor 55 may, in some embodiments, also detect the filtered ambient light 1022 which has passed through the eyepiece display 70 from the user's surroundings.

The display light sensor 55 can have a light-sensitive element to detect and integrate one or more characteristics (e.g., luminance and/or chromaticity) of the display light 1044 across all, or a portion of, the out-coupling region of the eyepiece display 70. In some embodiments, the display light sensor 55 can have multiple light sensitive elements to separately detect one or more characteristics of the display light 1044 from different locations of the out-coupling region of the eyepiece display 70.

The display light sensor 55 can also provide its detection output to the display controller 560 for processing. The detection output of the display light sensor 55 may be, for example, one or more measurements of the luminance and/or chromaticity of the display light 1044. The detection output of the display light sensor 55 can be used to determine whether it will be perceptible to the user 90 to shut off the light source 530 when no virtual content is being displayed by the eyepiece display 70, as discussed further below.

In the FIG. 11B embodiment, the display controller 560 can use the display light sensor 55 to operate the light source 530 and/or the spatial light modulator 540 in a closed-loop control mode. For example, the display controller 560 can use the detection output of the display light sensor 55 as feedback to set the power level of the light source 530 appropriately so as to result in the display light 1044 having a desired amount of luminance. Since the display light sensor 55 may detect the filtered ambient light 1022 in addition to the display light 1044, when using the detection output of the display light sensor 55 to control the light source 530, it may be desirable to use the detection output of the ambient light sensor 50 in conjunction with known information about the filtering properties of the eyepiece display 70 (which can be measured, for example, during calibration of the AR display system 60) to mathematically compensate for the effect of the filtered ambient light 1022 on the detection output of the display light sensor 55. Alternatively, in the FIG. 11A embodiment, which does not include the display light sensor 55, the display controller 560 can operate the light source 530 and/or the spatial light modulator 540 in an open-loop control mode. In the open-loop control mode, given a particular state of the spatial light modulator 540 (e.g., all pixels set to the darkest state), the luminance of the display light 1044 can be calibrated to the power setting of the light source 530 so as to allow the display controller 560 to still control the display light 1044 to have a desired amount of luminance. The closed-loop and/or open-loop capabilities of the display controller 560 to control the light source 530 can be used for a variety of purposes, including to cause the display light 1044 to have a desired amount of luminance when no virtual content is being shown, according to the techniques described herein.

Figure 12:
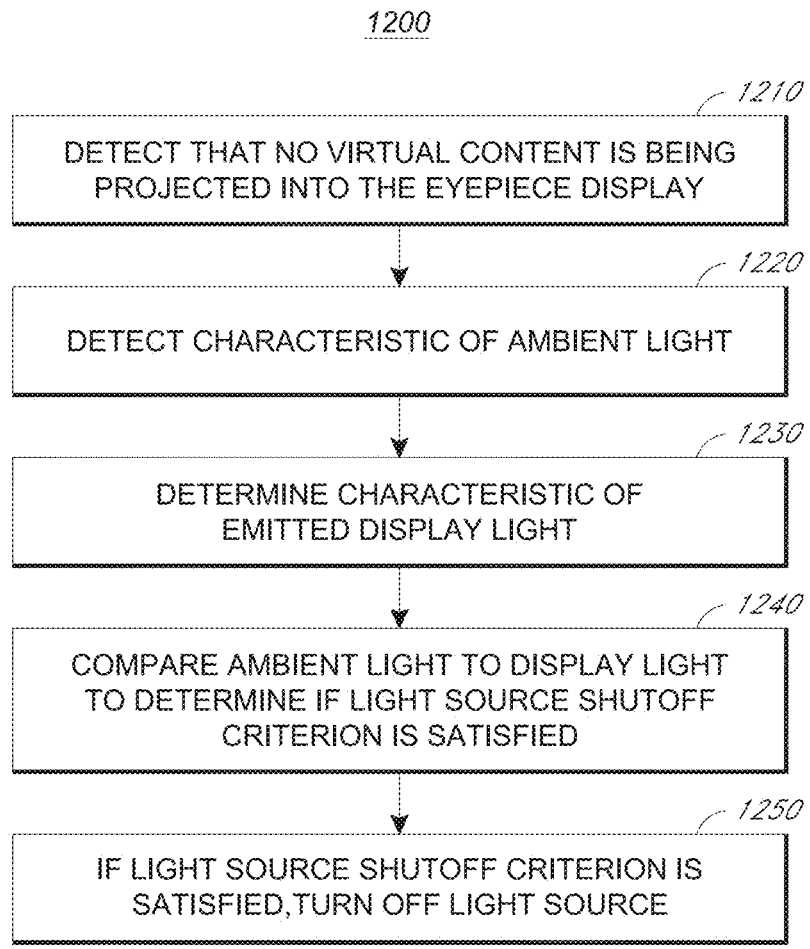
FIG. 12 is a flowchart of a method for using the systems shown in FIGS. 11A and 11B to determine whether the light source for the eyepiece display can be turned off without resulting in a user-perceptible change in the display light which is emitted from the eyepiece display.

FIG. 12 is a flowchart of a method 1200 for using the systems shown in FIGS. 11A and 11B to determine whether the light source 530 for the eyepiece display 70 can be turned off without resulting in a user-perceptible change in the display light 1044 which is emitted from the eyepiece display 70. In some embodiments, the method 1200 is carried out by the display controller 560. In some embodiments, the method 1200 can be carried out by some other component of the AR display system 60.

The method 1200 begins at block 1210 where the display controller 560 can make the determination that no virtual content is being projected (or no virtual content is going to be projected within some period of time) into the eyepiece display 70. In some embodiments, the display controller 560 may be designed to make this determination when each and every pixel of the spatial light modulator 540 is set (or is going to be set) to its darkest state. This may be the case when, for example, the digital value of each and every pixel of the current frame (or a subsequent frame) of image data is zero. In other embodiments, however, the display controller 560 can be designed to make the determination that no virtual content is being projected (or is going to be projected) into the eyepiece display 70 when at least 99%, or 95%, or 90% of the pixels of the spatial light modulator 540 are set (or will be set) either to the darkest state or to a state with a luminance that is no more than 5%, or no more than 10%, of the brightest state.

If, at block 1210, the determination is made that no virtual content is being projected (or that no virtual content is going to be projected within some period of time) into the eyepiece display 70, then the method 1200 can proceed to block 1220. At block 1220, the display controller 560 can detect a characteristic, such as the current luminance and/or chromaticity, of the ambient light 1020 or the filtered ambient light 1022. This can be done using the ambient light sensor 50 (or the display light sensor 55 if it detects the filtered ambient light 1020 and the display light 1044 but the display light is known and can therefore be subtracted out or otherwise compensated for).

Then, at block 1230, the display controller 560 can determine a characteristic, such as the current luminance and/or chromaticity, of the display light 1044 being emitted from the eyepiece display 70. For the embodiment shown in FIG. 11A, the luminance and/or chromaticity of the display light 1044 can be determined based on the current power setting of the light source 530. For the embodiment shown in FIG. 11B, the luminance and/or chromaticity of the display light 1044 can be determined using the display light sensor 55 and/or the current power setting of the light source 530. Since the display light sensor 55 may pick up not only the display light 1044 but also the filtered ambient light 1022, it may be desirable to compensate for (e.g., reduce or remove) the effect of the filtered ambient light 1022 on the measurement taken by the display light sensor 55.

The effect of the filtered ambient light 1022 on the measurement taken by the display light sensor 55 can be compensated for (e.g., reduced or removed) using information from the ambient light sensor 50. For example, if the ambient light sensor 50 and the display light sensor 55 both measure luminance, then the luminance value measured by the ambient light sensor 50 can be subtracted from the luminance value measured by the display light sensor 55. In the case where the ambient light sensor 50 is positioned on the user-side of the eyepiece display 70, facing the world, such that it detects the filtered ambient light 1022 that has already passed through the eyepiece display 70, then the luminance measurement from the ambient light sensor 50 can be directly subtracted from the luminance measurement taken by the display light sensor 55 to arrive at the luminance of the display light 1044. If the ambient light sensor 50 is positioned on the world-side of the eyepiece display 70, facing outwardly, such that it detects the ambient light 1020 before it passes through the eyepiece display 70, then the luminance value measured by the ambient light sensor 50 can first be adjusted for the filtering effect of the eyepiece display 70 before it is subtracted from the luminance value measured by the display light sensor 55 to arrive at the luminance of the display light 1044. In some embodiments, the filtering effect of the eyepiece display 70 on the luminance of the ambient light 1020 that passes through it can be measured at the time of manufacture. If, for example, the eyepiece display 70 reduces the luminance of the ambient light 1020 by X %, then the value X can be stored in the AR display system 60 and the display controller 560 can reduce the measurement from the ambient light sensor 50 by X % prior to subtracting it from the luminance measurement from the display light sensor 55. Similar techniques can be used for chromaticity measurements as well by making separate adjustments for different wavelengths or color components of the ambient light 1020, the filtered ambient light 1022, and/or the display light 1044.

Once the characteristic (e.g., luminance and/or chromaticity) of the display light 1044 has been determined at block 1230, then the method 1200 can proceed to block 1240. At block 1240, the display controller 560 can compare the ambient light 1020 and/or the filtered ambient light 1022 to the display light 1044. Based on this comparison, the display controller 560 can determine whether a light source shutoff criterion is satisfied. The light source shutoff criterion can be indicative of whether shutting off the light source 530 would result in a user-perceptible change in the display light 1044 which is emitted from the eyepiece display 70. Examples of the light source shutoff criterion are described with respect to FIGS. 13A and 13B. All of the light source shutoff criteria discussed herein can be used with either of the AR display system 60 embodiments illustrated in FIGS. 11A and 11B.

Figure 13A:
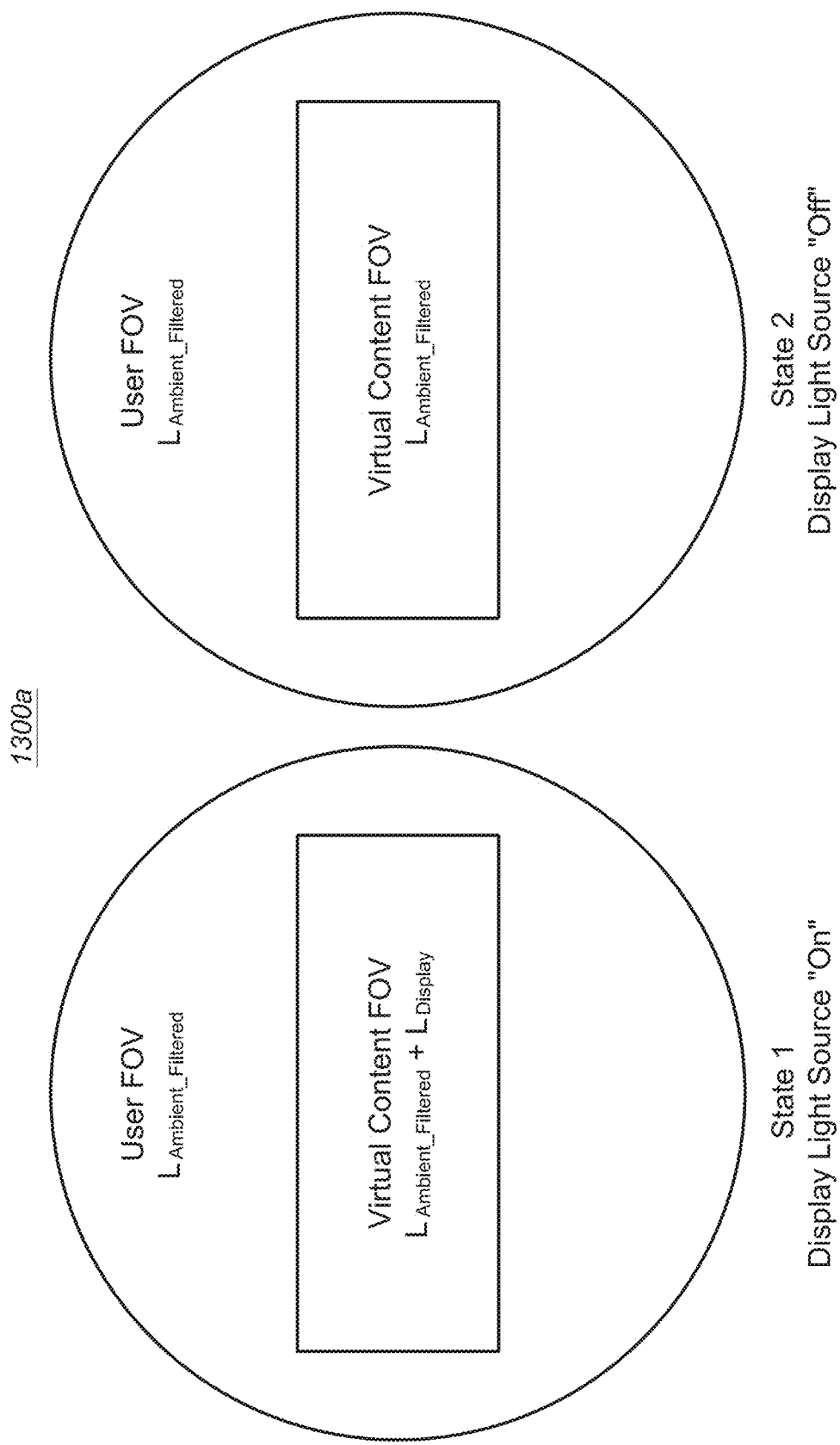
FIG. 13A is a diagram that illustrates a light source shutoff criterion that is based on luminance.

FIG. 13A is a diagram 1300a that illustrates a light source shutoff criterion that is based on luminance. The diagram 1300a includes two circles which represent the eyepiece display 70 in different states. Each circle represents the entire field of view of the user 90 through the eyepiece display 70. Each circle includes a rectangle which represents the field of view of the display portion of the eyepiece display 70 (i.e., the portion of the eyepiece display 70 where virtual content can be shown). The left-hand circle represents the eyepiece display 70 while the light source 530 is on, whereas the right-hand circle represents the eyepiece display while the light source is off.

As shown in both circles in FIG. 13A, the filtered ambient light 1022 that is seen by the user 90 outside of the display portion of the eyepiece display 70 can be represented by the average luminance value $L_{Ambient\_Filtered}$. Various techniques for determining $L_{Ambient\_Filtered}$ are described below.

Inside the display portion of the eyepiece display 70, the left-hand circle shows that, when the light source 530 is on, the light that can be seen by the user 90 can be represented by the addition of two luminance values: the average luminance, $L_{Ambient\_Filtered}$, of the filtered ambient light 1022 and the average luminance, $L_{Display}$, of the display light 1044 that is emitted by the eyepiece display 70. This luminance value, $L_{Ambient\_Filtered}+L_{Display}$, can be determined using, for example, the display light sensor 55. Meanwhile, the right-hand circle shows that, when the light source 530 is off, the light that can be seen by the user 90 in the display portion of the eyepiece display 70 can be represented by simply the average luminance, $L_{Ambient\_Filtered}$, of the filtered ambient light 1022.

A value, $\Delta L$, called the just-noticeable luminance difference represents the change in luminance above which the change is perceptible by the user 90 and below which the change is not perceptible by the user 90. In some embodiments, the just-noticeable luminance difference, $\Delta L$, can be defined as a percentage of the average filtered ambient luminance, $L_{Ambient\_Filtered}$. The just-noticeable luminance difference, $\Delta L$, can be found by multiplying $L_{Ambient\_Filtered}$ times a selected constant, k. In some embodiments, the percentage of $L_{Ambient\_Filtered}$ may be 5% (i.e., k=0.05) or less, or 1% (i.e., k=0.01) or less, or 0.5% (i.e., k=0.005) or less, or 0.1% (i.e., k=0.001) or less, depending on the application and/or a built-in margin of error. The constant, k, can be determined theoretically or experimentally.

Since the average luminance, $L_{Display}$, of the display light 1044 represents the change in luminance that occurs when the light source 530 is transitioned from the on state to the off state, if $L_{Display}$ is greater than the just-noticeable luminance difference, $\Delta L$, then shutting off the light source will be perceptible to the user 90. To the contrary, if $L_{Display}$ is less than the just-noticeable luminance difference, $\Delta L$, then shutting off the light source 530 will not be perceptible to the user 90.

In some embodiments, the determination of whether the light source shutoff criterion is satisfied can include calculation of the just-noticeable luminance difference, $\Delta L$, by determining the average filtered ambient luminance, $L_{Ambient\_Filtered}$, and multiplying that value times the constant, k. The display luminance, $L_{Display}$, can then be determined and compared to the just-noticeable luminance difference, $\Delta L$. Techniques for determining $L_{Ambient\_Filtered}$ and $L_{Display}$ are now discussed.

The average filtered ambient luminance, $L_{Ambient\_Filtered}$, can be determined in at least three ways: 1) A measurement of the unfiltered ambient light 1020 can be taken by the ambient light sensor 50. This measurement can then be mathematically adjusted based on the known filtering effect of the eyepiece display 70 to yield $L_{Ambient\_Filtered}$. This technique can be used if the ambient light sensor 50 is positioned on the world-side of the eyepiece display 70. 2) If the filtering effect of the eyepiece display 70 is unknown, then a measurement of ($L_{Ambient\_Filtered} + L_{Display}$) can be taken by the display light sensor 55. The average filtered ambient luminance, $L_{Ambient\_Filtered}$, can then be calculated by subtracting $L_{Display}$ (which can be determined using one of the techniques described in the following paragraph) from that measurement. 3) If the ambient light sensor 50 is positioned on the eye-side of the eyepiece display 70, facing the world, then, in some embodiments, it can measure $L_{Ambient\_Filtered}$ directly.

Meanwhile, the average display luminance, $L_{Display}$, can be determined in at least two ways: 1) During calibration of the AR display system 60, the value of $L_{Display}$ can be measured for various power settings of the light source 530 (e.g., while the pixels of the spatial light modulator are set to the darkest state). Using these measurements, the value of $L_{Display}$ can be calibrated to the power setting of the light source 530 for the situation where no virtual content is being displayed. This calibration allows the display controller 560 to determine and control $L_{Display}$, in an open-loop control mode, based on the power setting of the light source 530. According to this technique, $L_{Display}$ can be determined even if the AR display system 60 does not include the display light sensor 55. 2) If the AR display system 60 does include the display light sensor 55, and if the filtering effect of the eyepiece display 70 is known, then the average display luminance, $L_{Display}$, can be found by determining $L_{Ambient\_Filtered}$ (using one of the techniques described in the preceding paragraph) and subtracting $L_{Ambient\_Filtered}$ from a measurement of ($L_{Ambient\_Filtered} + L_{Display}$) taken by the display light sensor 55 so as to yield $L_{Display}$. This technique can be used even if $L_{Display}$ has not been calibrated to the power setting of the light source 530.

As already discussed, in some embodiments, the just-noticeable luminance difference, $\Delta L$, can be defined as a constant, k, times $L_{Ambient\_Filtered}$. While the just-noticeable luminance difference, $\Delta L$, can be defined as a linear function of the ambient luminance, $L_{Ambient\_Filtered}$, other definitions can also be used. For example, piece-wise models that take into account non-linearities of the human visual system for very bright and very dark ambient lighting conditions can also be used. One such definition is Ferwerda's piecewise function, which can be found in Table 1 of "A Visibility Matching Tone Reproduction Operator for High Dynamic Range Scenes," IEEE Transactions on Visualization and Computer Graphics, pp. 291-306, Volume 3, Oct-Dec 1997, by Larson et al., the entire contents of which are hereby incorporated by reference herein. Other definitions for the just-noticeable luminance difference, $\Delta L$, can also be used.

Figure 13B:
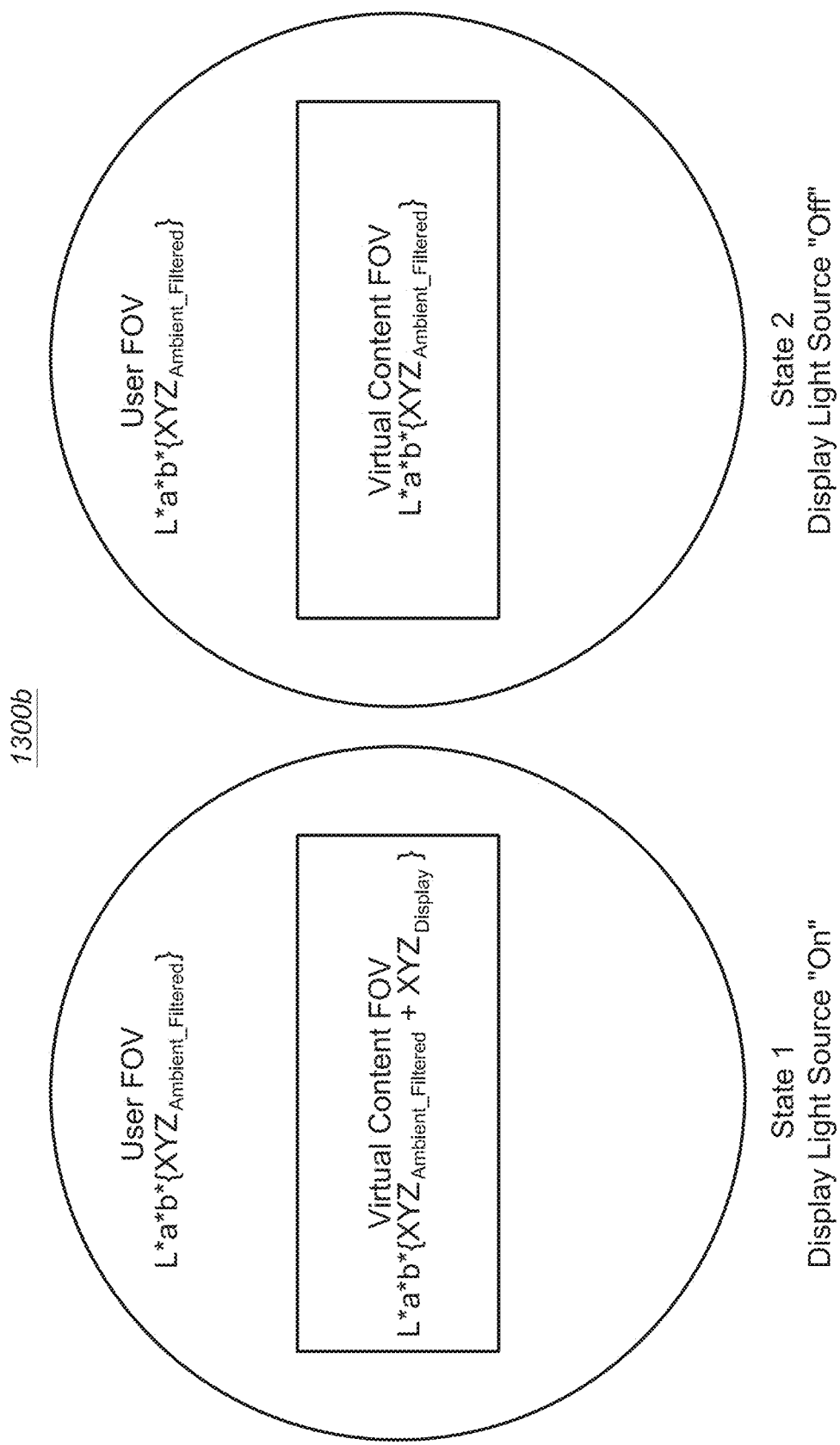
FIG. 13B is a diagram that illustrates a light source shutoff criterion that is based on luminance and chromaticity.

FIG. 13B is a diagram 1300b that illustrates a light source shutoff criterion that is based on luminance and chromaticity. Specifically, the light source shutoff criterion in FIG. 13B is based on color difference. Color difference can be understood as, for example, the Euclidean distance between two colors in a color space. In some embodiments, the color space that is used for computing the color difference is the International Commission on Illumination (CIE) 1931 RGB color space, the CIE 1931 XYZ color space, the CIE 1976 L*u*v* color space, or the CIE 1976 L*a*b* color space. Other color spaces can also be used, however.

In embodiments which use color difference as the light source shutoff criterion, the ambient light sensor 50 and/or the display light sensor 55 can separately detect light of multiple wavelengths or color components for the ambient light 1020, the filtered ambient light 1022, and/or the display light 1044. For example, the ambient light sensor 50 and the display light sensor 55 may measure tristimulus color values or even complete visible spectra for the ambient light 1020, the filtered ambient light 1022, and/or the display light 1044.

Like the diagram 1300a in FIG. 13A, the diagram 1300b in FIG. 13B includes two circles which represent the eyepiece display 70 in different states. Each circle represents the entire field of view of the user 90 through the eyepiece display 70. Each circle includes a rectangle which represents the field of view of the display portion of the eyepiece display 70 (i.e., the portion of the eyepiece display 70 where virtual content can be shown). The left-hand circle represents the eyepiece display 70 while the light source 530 is on, whereas the right-hand circle represents the eyepiece display while the light source is off.

As shown in both circles in FIG. 13B, the filtered ambient light 1022 that is seen by the user 90 outside of the display portion of the eyepiece display 70 can be represented by XYZ tristimulus color values. These can be converted to the more perceptually uniform L*a*b* color space, as shown in FIG. 13B. The XYZ and L*a*b* values are both three-dimensional vectors which can be used to represent points in color spaces. For example, L*a*b*{$XYZ_{Ambient\_Filtered}$} represents a point in the L*a*b* color space. This point in the color space can be determined using the ambient light sensor 50.

Inside the display portion of the eyepiece display 70, the left-hand circle shows that, when the light source 530 is on, the light that can be seen by the user 90 can be represented by the combination of two XYZ tristimulus color values: the color, $XYZ_{Ambient\_Filtered}$, of the filtered ambient light 1022 and the color, $XYZ_{Display}$, of the display light 1044 that is emitted by the eyepiece display 70. The combination of these XYZ tristimulus colors can be converted to the L*a*b* color space, resulting in L*a*b* {$XYZ_{Ambient\_Filtered} + XYZ_{Display}$}. This point in the color space can be determined using the display light sensor 55. Meanwhile, the right-hand circle shows that, when the light source 530 is off, the light that can be seen by the user 90 in the display portion of the eyepiece display 70 can be represented by simply the color, L*a*b*{$XYZ_{Ambient\_Filtered}$}, of the filtered ambient light 1022.

A value, $\Delta E$, called the just-noticeable color difference represents the minimum color difference which is perceptible by the user 90. If the distance between the points L*a*b* {$XYZ_{Ambient\_Filtered} + XYZ_{Display}$} and L*a*b*{$XYZ_{Ambient\_Filtered}$} in the L*a*b* color space is greater than the just-noticeable color difference, $\Delta E$, then shutting off the light source 530 will be perceptible to the user 90. To the contrary, if the distance between the points L*a*b* {$XYZ_{Ambient\_Filtered} + XYZ_{Display}$} and L*a*b*{$XYZ_{Ambient\_Filtered}$} in the L*a*b* color space is less than the just-noticeable color difference, $\Delta E$, then shutting off the light source 530 will not be perceptible to the user 90. The just-noticeable color difference, $\Delta E$, can be determined theoretically or experimentally In some embodiments, the determination of whether the light source shutoff criterion is satisfied can include determination of $XYZ_{Ambient\_Filtered}$ and $XYZ_{Display}$. The points L*a*b* {$XYZ_{Ambient\_Filtered} + XYZ_{Display}$} and L*a*b*{$XYZ_{Ambient\_Filtered}$} can then be determined and the distance between those points can be calculated and compared to the just-noticeable color difference, $\Delta E$. Techniques for determining $XYZ_{Ambient\_Filtered}$ and $XYZ_{Display}$ are now discussed.

The color, $XYZ_{Ambient\_Filtered}$, of the filtered ambient 1022 can be determined in at least three ways: 1) A measurement of the color of the unfiltered ambient light 1020 can be taken by the ambient light sensor 50. If the visible spectrum of the unfiltered ambient light 1020 is measured by the ambient light sensor 50, then it can be multiplied by the known filtering spectrum of the eyepiece display 70 to yield the spectrum of the filtered ambient light 1022. The spectrum of the filtered ambient light 1022 can then be decomposed into tristimulus values to yield the color, $XYZ_{Ambient\_Filtered}$, of the filtered ambient light 1022. If only tristimulus values of the ambient light 1020 are measured by the ambient light sensor 50, then they can each be adjusted based on the known filtering effects of the eyepiece display 70 to yield the color, $XYZ_{Ambient\_Filtered}$, of the filtered ambient light 1022. This first technique can be used if the ambient light sensor 50 is positioned on the world-side of the eyepiece display 70. 2) If the filtering effect of the eyepiece display 70 is unknown, then a measurement of $(XYZ_{Ambient\_Filtered}+XYZ_{Display})$ can be taken by the display light sensor 55. $XYZ_{Ambient\_Filtered}$, can then be calculated by subtracting $XYZ_{Display}$ (which can be determined using one of the techniques described in the following paragraph) from that measurement. 3) If the ambient light sensor 50 is positioned on the eye-side of the eyepiece display 70, facing the world, then, in some embodiments, it can measure $XYZ_{Ambient\_Filtered}$ directly.

Meanwhile, the color, $XYZ_{Display}$, of the display light 1044 can be determined in at least two ways: 1) During calibration of the AR display system 60, $XYZ_{Display}$ can be measured for various power settings of the light source 530 (e.g., while the pixels of the spatial light modulator are set to the darkest state). Using these measurements, $XYZ_{Display}$ can be calibrated to the power setting of the light source 530 for the situation where no virtual content is being displayed. This calibration allows the display controller 560 to determine and control $XYZ_{Display}$, in an open-loop control mode, based on the power setting of the light source 530. According to this technique, $XYZ_{Display}$ can be determined even if the AR display system 60 does not include the display light sensor 55. 2) If the AR display system 60 does include the display light sensor 55, and if the filtering effects of the eyepiece display 70 are known, then the color, $XYZ_{Display}$, of the display light 1044 can be found by determining $XYZ_{Ambient\_Filtered}$ (using one of the techniques described in the preceding paragraph) and subtracting $XYZ_{Ambient\_Filtered}$ from a measurement of $(XYZ_{Ambient\_Filtered}+XYZ_{Display})$ taken by the display light sensor 55 so as to yield $XYZ_{Display}$. This technique can be used even if $XYZ_{Display}$ has not been calibrated to the power setting of the light source 530.

The color difference, ΔE, between the points L*a*b* $\{XYZ_{Ambient\_Filtered}+XYZ_{Display}\}$ and L*a*b* $\{XYZ_{Ambient\_Filtered}\}$ in the L*a*b* color space can be computed in a variety of ways. A computationally efficient method is the CIE76 color difference, which is the Euclidean distance between the two points. Other methods can also be used, however, such as the CIE94 Color Difference or the CIEDE2000 Color Difference.

With reference now back to FIG. 12, once the comparison of the ambient light 1020 or the filtered ambient light 1022 to the display light 1044 has been made, the method 1200 can proceed to block 1250. At block 1250, the display controller 560 can turn off the light source 530 if the light source shutoff criterion is satisfied. The light source shutoff criterion is satisfied if it indicates that shutting off the light source 530 will result in a non-user-perceptible change in the display light 1044. If the light source shutoff criterion is not satisfied, the display controller 560 can leave the light source 530 on—despite the fact that no virtual content is being displayed—in order to avoid a user-perceptible change in the emitted display light 1044. When there is once again virtual content to be displayed on the eyepiece display 70, the display controller 560 can turn the light source 530 back on.

In some embodiments, the method 1200 shown in FIG. 12 can be carried out for each frame of digital image data provided to the display controller 560. In other embodiments, however, the display controller 560 can, in block 1210, look ahead at future frames of digital image data or at a no-virtual-content/active-virtual-content signal provided by the AR display system 60 to determine whether virtual content will need to be displayed within some threshold period of time. If virtual content will need to be displayed within the threshold period of time, then, in some embodiments the method 1200 may terminate after block 1210. This may be advantageous in cases where it is only beneficial to turn off the light source 530 if it will thereafter be able to remain off for a certain minimum period of time.

Figure 14:
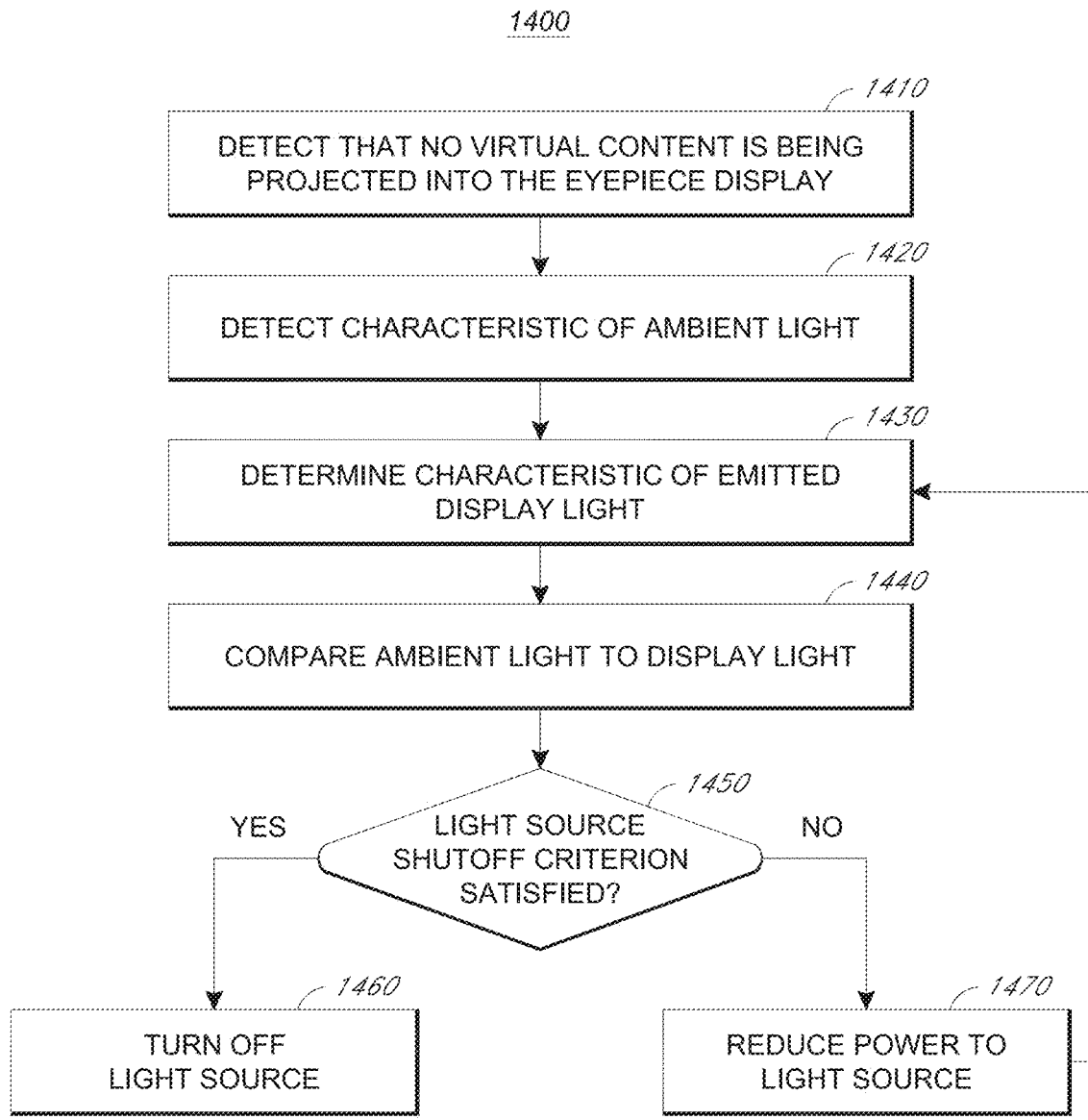
FIG. 14 is a flowchart of another method for using the systems shown in FIGS. 11A and 11B to determine whether the light source for the eyepiece display can be turned off without resulting in a user-perceptible change in the display light which is emitted from the eyepiece display.

FIG. 14 is a flowchart of another method 1400 for using the systems shown in FIGS. 11A and 11B to determine whether the light source 530 for the eyepiece display 70 can be turned off without resulting in a user-perceptible change in the display light 1044 which is emitted from the eyepiece display 70. In some embodiments, the method 1400 is carried out by the display controller 560. In some embodiments, the method 1400 can be carried out by some other component of the AR display system 60.

Blocks 1410, 1420, and 1430 of the method 1400 shown in FIG. 14 are the same as blocks 1210, 1220, and 1230, respectively, of the method 1200 shown in FIG. 12. At block 1440, the display controller 560 compares the ambient light 1020 or the filtered ambient light 1022 with the display light 1044. Then, at decision block 1450, the display controller 560 determines whether the light source shutoff criterion is satisfied. The same techniques discussed with respect to block 1240 in FIG. 12 can be used to carry out blocks 1440 and 1450 in FIG. 14.

Just as in the method 1200 shown in FIG. 12, if the display controller 560 determines that the light source shutoff criterion is satisfied, then, at block 1460, it turns off the light source 530. However, if, at the decision block 1450, the display controller 560 determines that the light source shutoff criterion is not satisfied, then the method 1400 proceeds to block 1470.

At block 1470, the display controller 560 reduces power to the light source 530 to decrease its luminance. This also has the effect of reducing the luminance of the display light 1044 which is emitted by the eyepiece display 70. In some embodiments, the display controller 560 decreases the luminance of the light source 530 according to a linear ramp profile, though other profiles can also be used.

Reducing the luminance of the light source 530—and hence also the luminance of the display light 1044—increases the likelihood that the light source shutoff criterion will be satisfied once the method 1400 cycles back from block 1470 to block 1430 and iterates through blocks 1440 and 1450 again. In some embodiments, at block 1470, the display controller 560 decreases the luminance of the light source 530 at a rate that is less than one ΔL or ΔE per eye integration period. (One eye integration period is typically 0.15-0.2 seconds.) By not exceeding this rate of reduction of the luminance of the light source 530, the display controller 560 can ensure that the reduction in the luminance of the display light 1044 will not be perceptible to the user 90.

In some embodiments, at block 1410, the display controller 560 determines, based on looking ahead at future frames of digital image data or based on a no-virtual-content/active-virtual-content signal provided by the AR display system 60, when virtual content will once again be displayed to the user 90. If the period of time where no virtual content will be displayed to the user 90 is shorter than the period of time that will be needed to ramp down the luminance of the display light 1044, or if it is shorter than the period of time that will be needed to ramp down and then ramp back up (as discussed below) the luminance of the display light 1044, then the method 1400 may instead terminate after block 1410.

When there is once again virtual content to be displayed on the eyepiece display 70, the display controller 560 can turn the light source 530 back on. In some embodiments, the light source 530 is turned back on to the desired luminance level according to a step function profile. In some embodiments, the display controller 560 can increase the luminance of the light source 530 over a period of time prior to when the virtual content will be displayed. For example, the display controller 560 can ramp up the luminance of the light source 530—and hence also the luminance of the display light 1044—in a manner which will make the increase in luminance of the display light less perceptible, or even imperceptible, to the user 90. This may be accomplished by increasing the luminance of the light source 530 at a rate that is less than one AL or AE per eye integration period.

Example Embodiments

1. An augmented reality display system comprising: an eyepiece display configured to be worn by a user, the eyepiece display being at least partially transparent so as to transmit ambient light toward the eye of the user; an ambient light sensor configured to detect the ambient light; an image input device capable of inputting virtual content into the eyepiece display, the image input device comprising a light source and a spatial light modulator illuminated by the light source; and a controller, wherein the eyepiece display is configured to emit display light, and wherein the controller is configured to: determine that no virtual content is being displayed to the user; compare the ambient light to the display light to determine if a light source shutoff criterion is satisfied, the light source shutoff criterion being indicative of whether shutting off the light source that illuminates the spatial light modulator will result in a change in the display light that will be user-perceptible, and turn off the light source if the light source shutoff criterion is satisfied.

2. The augmented reality display system of claim 1, wherein the controller is configured to compare the ambient light to the display light using on one or more ambient light values measured by the ambient light sensor and one or more display light values.

3. The augmented reality display system of claim 2, wherein the controller is configured to determine the one or more display light values based on the state of the light source.

4. The augmented reality display system of claim 2, further comprising a display light sensor, wherein the controller is configured to measure the one or more display light values using the display light sensor.

5. The augmented reality display system of claim 4, wherein the display light sensor is configured to detect luminance of the display light.

6. The augmented reality display system of claim 5, wherein the display light sensor is configured to detect luminance and chromaticity of the display light.

7. The augmented reality display system of claim 1, wherein the ambient light sensor is configured to detect luminance of the ambient light.

8. The augmented reality display system of claim 7, wherein the ambient light sensor is configured to detect luminance and chromaticity of the ambient light.

9. The augmented reality display system of claim 1, wherein the ambient light sensor is positioned so as to detect the ambient light before it passes through the eyepiece display.

10. The augmented reality display system of claim 1, wherein the ambient light sensor is positioned so as to detect filtered ambient light that has passed through the eyepiece display.

11. The augmented reality display system of claim 1, wherein the controller is configured to compare unfiltered ambient light to the display light.

12. The augmented reality display system of claim 1, wherein the controller is configured to compare filtered ambient light that has passed through the eyepiece display to the display light.

13. The augmented reality display system of claim 1, wherein the shutoff criterion is based on luminance.

14. The augmented reality display system of claim 13, wherein the shutoff criterion comprises a just-noticeable luminance difference.

15. The augmented reality display system of claim 14, wherein the just-noticeable luminance difference comprises a percentage of the luminance of the filtered ambient light.

16. The augmented reality display system of claim 15, wherein the controller is further configured to determine the luminance of the filtered ambient light based on the luminance of unfiltered ambient light that has not passed through the eyepiece display and based on information indicative of the filtering effect of the eyepiece display on the unfiltered ambient light.

17. The augmented reality display system of claim 15, wherein the controller is further configured to determine if the light source shutoff criterion is satisfied based on a difference between the just-noticeable luminance difference and the average luminance of the display light when no virtual content is being displayed.

18. The augmented reality display system of claim 1, wherein the shutoff criterion is based on chromaticity.

19. The augmented reality display system of claim 18, wherein the shutoff criterion comprises a just-noticeable color difference.

20. The augmented reality display system of claim 19, wherein the color difference comprises the International Commission on Illumination CIE76 color difference.

21. The augmented reality display system of claim 19, wherein determining if the light source shutoff criterion is satisfied comprises calculating a distance between a point in a color space that corresponds to the color of filtered ambient light that has passed through the eyepiece display and a point in the color space that corresponds to a combination of the color of the display light, when no virtual content is being displayed to the user, and the color of the filtered ambient light.

22. The augmented reality display system of claim 21, wherein the controller is further configured to determine the color of the filtered ambient light based on the color of unfiltered ambient light that has not passed through the eyepiece display and based on information indicative of the filtering effects of the eyepiece display on the unfiltered ambient light.

23. The augmented reality display system of claim 21, wherein the controller is further configured to determine the color of the display light by compensating for the effect of the filtered ambient light on a measurement of the display light.

24. The augmented reality display system of claim 21, wherein the color space comprises the CIE 1931 RGB color space, the CIE 1931 XYZ color space, the CIE 1976 L*u*v* color space, or the CIE 1976 L*a*b* color space.

25. The augmented reality display system of claim 1, wherein the controller is further configured to reduce luminance of the light source before turning off the light source.

26. The augmented reality display system of claim 25, wherein the controller is configured to reduce the luminance of the light source at a rate that is less than one just-noticeable luminance difference or one just-noticeable color difference per eye integration period.

27. A method in an augmented reality display system, the method comprising: determining that no virtual content is being displayed by an eyepiece display of the augmented reality display system; detecting ambient light using an ambient light sensor; comparing the ambient light to display light emitted by the eyepiece display when no virtual content is being displayed determining, based on the comparison, that a light source shutoff criterion is satisfied, the light source shutoff criterion being indicative of whether shutting off a light source that illuminates a spatial light modulator in an image input device for the augmented reality display system will result in a change in the display light that will be user-perceptible; turning off the light source.

28. The method of claim 27, wherein comparing the ambient light to the display light comprises using on one or more ambient light values measured by the ambient light sensor and one or more display light values.

29. The method of claim 28, further comprising determining the one or more display light values based on the state of the light source.

30. The method of claim 28, further comprising measuring the one or more display light values using a display light sensor.

31. The method of claim 30, further comprising detecting luminance of the display light with the display light sensor.

32. The method of claim 31, further comprising detecting luminance and chromaticity of the display light with the display light sensor.

33. The method of claim 27, further comprising detecting luminance of the ambient light using the ambient light sensor.

34. The method of claim 33, further comprising detecting luminance and chromaticity of the ambient light with the ambient light sensor.

35. The method of claim 27, wherein detecting the ambient light comprises doing so before it passes through the eyepiece display.

36. The method of claim 27, wherein detecting the ambient light comprises doing so after it has passed through the eyepiece display.

37. The method of claim 27, further comprising comparing unfiltered ambient light to the display light.

38. The method of claim 27, further comprising comparing filtered ambient light that has passed through the eyepiece display to the display light.

39. The method of claim 27, wherein the shutoff criterion is based on luminance.

40. The method of claim 39, wherein the shutoff criterion comprises a just-noticeable luminance difference.

41. The method of claim 40, wherein the just-noticeable luminance difference comprises a percentage of the luminance of the filtered ambient light.

42. The method of claim 41, further comprising determining the luminance of the filtered ambient light based on the luminance of unfiltered ambient light that has not passed through the eyepiece display and based on information indicative of the filtering effect of the eyepiece display on the unfiltered ambient light.

43. The method of claim 41, further comprising determining if the light source shutoff criterion is satisfied based on a difference between the just-noticeable luminance difference and the average luminance of the display light when no virtual content is being displayed.

44. The method of claim 27, wherein the shutoff criterion is based on chromaticity.

45. The method of claim 44, wherein the shutoff criterion comprises a just-noticeable color difference.

46. The method of claim 45, wherein the color difference comprises the International Commission on Illumination CIE76 color difference.

47. The method of claim 45, wherein determining that the light source shutoff criterion is satisfied comprises calculating a distance between a point in a color space that corresponds to the color of filtered ambient light that has passed through the eyepiece display and a point in the color space that corresponds to a combination of the color of the display light, when no virtual content is being displayed to the user, and the color of the filtered ambient light.

48. The method of claim 47, further comprising determining the color of the filtered ambient light based on the color of unfiltered ambient light that has not passed through the eyepiece display and based on information indicative of the filtering effects of the eyepiece display on the unfiltered ambient light.

49. The method of claim 47, further comprising determining the color of the display light by compensating for the effect of the filtered ambient light on a measurement of the display light.

50. The method of claim 47, wherein the color space comprises the CIE 1931 RGB color space, the CIE 1931 XYZ color space, the CIE 1976 L*u*v* color space, or the CIE 1976 L*a*b* color space.

51. The method of claim 27, further comprising reducing luminance of the light source before turning off the light source.

52. The method of claim 51, further comprising reducing the luminance of the light source at a rate that is less than one just-noticeable luminance difference or one just-noticeable color difference per eye integration period.

Conclusion

Each of the processes, methods, and/or algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and sub-combinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An augmented reality display system comprising:
an eyepiece display configured to be worn by a user, the eyepiece display being at least partially transparent so as to transmit ambient light toward the eye of the user;
an ambient light sensor configured to detect the ambient light;
an image input device capable of inputting virtual content into the eyepiece display, the image input device comprising a light source and a spatial light modulator illuminated by the light source; and
a controller,
wherein the eyepiece display is configured to emit display light, and
wherein the controller is configured to:
determine that no virtual content is being displayed to the user; compare the ambient light to the display light to determine if a light source shutoff criterion is satisfied, and
turn off the light source if the light source shutoff criterion is satisfied.

2. The augmented reality display system of claim 1, wherein the controller is configured to compare the ambient light to the display light using one or more ambient light values measured by the ambient light sensor and one or more display light values.

3. The augmented reality display system of claim 2, wherein the controller is configured to determine the one or more display light values based on the state of the light source.

4. The augmented reality display system of claim 2, further comprising a display light sensor, wherein the controller is configured to measure the one or more display light values using the display light sensor.

5. The augmented reality display system of claim 4, wherein the display light sensor is configured to detect luminance of the display light.

6. The augmented reality display system of claim 5, wherein the display light sensor is configured to detect luminance and chromaticity of the display light.

7. The augmented reality display system of claim 1, wherein the ambient light sensor is configured to detect luminance of the ambient light.

8. The augmented reality display system of claim 7, wherein the ambient light sensor is configured to detect luminance and chromaticity of the ambient light.

9. The augmented reality display system of claim 1, wherein the ambient light sensor is positioned so as to detect the ambient light before it passes through the eyepiece display.

10. The augmented reality display system of claim 1, wherein the ambient light sensor is positioned so as to detect filtered ambient light that has passed through the eyepiece display.

11. The augmented reality display system of claim 1, wherein the controller is configured to compare unfiltered ambient light to the display light.

12. The augmented reality display system of claim 1, wherein the controller is configured to compare filtered ambient light that has passed through the eyepiece display to the display light.

13. The augmented reality display system of claim 1, wherein the shutoff criterion is based on luminance.

14. The augmented reality display system of claim 13, wherein the shutoff criterion comprises a just-noticeable luminance difference.

15. The augmented reality display system of claim 14, wherein the just-noticeable luminance difference comprises a percentage of the luminance of filtered ambient light.

16. The augmented reality display system of claim 15, wherein the controller is further configured to determine the luminance of the filtered ambient light based on the luminance of unfiltered ambient light that has not passed through the eyepiece display and based on information indicative of the filtering effect of the eyepiece display on the unfiltered ambient light.

17. The augmented reality display system of claim 15, wherein the controller is further configured to determine if the light source shutoff criterion is satisfied based on a difference between the just-noticeable luminance difference and the average luminance of the display light when no virtual content is being displayed.

18. The augmented reality display system of claim 1, wherein the shutoff criterion is based on chromaticity.

19. The augmented reality display system of claim 18, wherein the shutoff criterion comprises a just-noticeable color difference.

20. The augmented reality display system of claim 19, wherein the color difference comprises the International Commission on Illumination CIE76 color difference.

21. The augmented reality display system of claim 19, wherein determining if the light source shutoff criterion is satisfied comprises calculating a distance between a point in a color space that corresponds to the color of filtered ambient light that has passed through the eyepiece display and a point in the color space that corresponds to a combination of the color of the display light, when no virtual content is being displayed to the user, and the color of the filtered ambient light.

22. The augmented reality display system of claim 21, wherein the controller is further configured to determine the color of the filtered ambient light based on the color of unfiltered ambient light that has not passed through the eyepiece display and based on information indicative of the filtering effects of the eyepiece display on the unfiltered ambient light.

23. The augmented reality display system of claim 21, wherein the controller is further configured to determine the color of the display light by compensating for the effect of the filtered ambient light on a measurement of the display light.

24. The augmented reality display system of claim 21, wherein the color space comprises the CIE 1931 RGB color space, the CIE 1931 XYZ color space, the CIE 1976 L*u*v* color space, or the CIE 1976 L*a*b* color space.

25. The augmented reality display system of claim 1, wherein the controller is further configured to reduce luminance of the light source before turning off the light source.

26. The augmented reality display system of claim 25, wherein the controller is configured to reduce the luminance of the light source at a rate that is less than one just-noticeable luminance difference or one just-noticeable color difference per eye integration period.

27. The augmented reality display system of claim 1, wherein the shutoff criterion is that the display light exceeds a predetermined threshold.

28. The augmented reality display system of claim 27, wherein the predetermined threshold comprises a percentage of the ambient light.

* * * * *